(12) United States Patent
Ray Chaudhuri et al.

(10) Patent No.: US 11,546,047 B2
(45) Date of Patent: Jan. 3, 2023

(54) COVERAGE EXPANSION AND INTERFERENCE OPERATING MODES FOR A REPEATER

(71) Applicant: QUALCOMM Incorporated, San Diego, CA (US)

(72) Inventors: Kausik Ray Chaudhuri, San Diego, CA (US); Atanu Basudeb Halder, San Diego, CA (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/124,227

(22) Filed: Dec. 16, 2020

(65) Prior Publication Data
US 2021/0194569 A1    Jun. 24, 2021

Related U.S. Application Data

(60) Provisional application No. 62/949,623, filed on Dec. 18, 2019.

(51) Int. Cl.
*H04B 7/155* (2006.01)

(52) U.S. Cl.
CPC ..... *H04B 7/15557* (2013.01); *H04B 7/15507* (2013.01)

(58) Field of Classification Search
CPC ... H04B 7/15507; H04B 7/15; H04B 7/15557
See application file for complete search history.

(56) References Cited

FOREIGN PATENT DOCUMENTS

CN    104106286 B    * 10/2018    ......... H04B 7/15507

* cited by examiner

*Primary Examiner* — Keith Ferguson
(74) *Attorney, Agent, or Firm* — Qualcomm Incorporated

(57) ABSTRACT

Methods, systems, and devices for wireless communications are described. In some systems, a repeater may receive a first signal from a transmitting device and determine an amplified version of the signal may not be successfully received by a receiving device. The repeater may transmit a mode switch message to the transmitting device to indicate a request for the transmitting device to switch to a transmission mode associated with one or more different transmission parameters based on detecting that the amplified version of the signal may not be received by the receiving device. The transmitting device may adjust one or more transmission parameters according to the mode switch message and may transmit a second signal to the repeater based on the adjusted transmission parameters. The repeater, operating according to the mode switch message, may receive the second signal and transmit an amplified version of the second signal to the receiving device.

30 Claims, 21 Drawing Sheets

COVERAGE EXPANSION AND INTERFERENCE OPERATING MODES FOR A REPEATER

CROSS REFERENCE

The present Application for Patent claims the benefit of U.S. Provisional Patent Application No. 62/949,623 by Ray Chaudhuri et al., entitled "COVERAGE EXPANSION AND INTERFERENCE OPERATING MODES FOR A REPEATER," filed Dec. 18, 2019, assigned to the assignee hereof, and expressly incorporated by reference in its entirety herein.

BACKGROUND

The following relates generally to wireless communications and more specifically to different operating modes (e.g., coverage expansion and interference operating modes) for a repeater.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support different operating modes (e.g., coverage expansion and interference operating modes) for a repeater. Generally, the described techniques provide for enhanced system efficiency by a smart repeater that may operate with full network coordination and according to network control in a wireless communications system. In some wireless communications systems, a repeater (e.g., a smart repeater) may communicate with a transmitting device and extend the coverage area of the transmitting device based on the communication and an operating gain of the repeater. The repeater may receive a first signal over a first bandwidth from the transmitting device and identify signal characteristics of the received signal. Based on the signal characteristics of the received signal, the repeater may detect that an amplification of the first signal may not satisfy an amplification threshold (e.g., the operating gain of the repeater may not overcome poor signal characteristics of the received signal).

The repeater may transmit a message to the transmitting device to indicate a request for the transmitting device to switch from a first mode (e.g., a default mode) to a coverage expansion mode. The transmitting device may receive the message and, accordingly, may switch to a coverage expansion mode associated with a second bandwidth. The repeater may receive an ingress signal over the second bandwidth that may be narrower than the first bandwidth and may transmit an egress signal that is an amplified version of the ingress signal based on the coverage expansion mode. Additionally or alternatively, the transmitting device may receive the message and may switch to an interference management mode associated with beamforming techniques for subsequent communications. For example, the transmitting device may use a beamforming operation to transmit a directional signal to the repeater, where the beamforming operation reduces interference with other signals transmitted to the repeater.

A method of wireless communications by a repeater is described. The method may include transmitting a mode switch message to a base station that indicates a request to switch from a first mode to a coverage expansion mode based on detection that amplification of a first signal received over a first bandwidth does not satisfy an amplification threshold and transmitting, in accordance with the coverage expansion mode, an egress signal that is an amplified version of an ingress signal that is received over a second bandwidth that is narrower than the first bandwidth based on the mode switch message.

An apparatus for wireless communications by a repeater is described. The apparatus may include a processor, memory coupled with the processor, and instructions stored in the memory. The instructions may be executable by the processor to cause the apparatus to transmit a mode switch message to a base station that indicates a request to switch from a first mode to a coverage expansion mode based on detection that amplification of a first signal received over a first bandwidth does not satisfy an amplification threshold and transmit, in accordance with the coverage expansion mode, an egress signal that is an amplified version of an ingress signal that is received over a second bandwidth that is narrower than the first bandwidth based on the mode switch message.

Another apparatus for wireless communications by a repeater is described. The apparatus may include means for transmitting a mode switch message to a base station that indicates a request to switch from a first mode to a coverage expansion mode based on detection that amplification of a first signal received over a first bandwidth does not satisfy an amplification threshold and transmitting, in accordance with the coverage expansion mode, an egress signal that is an amplified version of an ingress signal that is received over a second bandwidth that is narrower than the first bandwidth based on the mode switch message.

A non-transitory computer-readable medium storing code for wireless communications by a repeater is described. The code may include instructions executable by a processor to transmit a mode switch message to a base station that indicates a request to switch from a first mode to a coverage expansion mode based on detection that amplification of a first signal received over a first bandwidth does not satisfy an amplification threshold and transmit, in accordance with the coverage expansion mode, an egress signal that is an amplified version of an ingress signal that is received over a second bandwidth that is narrower than the first bandwidth based on the mode switch message.

In some examples of the method, apparatuses, and non-transitory computer-readable medium described herein, transmitting the mode switch message may include operations, features, means, or instructions for transmitting the mode switch message as a beacon signal.

Some examples of the method, apparatuses, and non-transitory computer-readable medium described herein may further include operations, features, means, or instructions for receiving, from the base station, a mode switch response message that instructs the repeater to operate in the coverage expansion mode based on the mode switch message.

Some examples of the method, apparatuses, and non-transitory computer-readable medium described herein may further include operations, features, means, or instructions for transmitting a second mode switch message to the base station that indicates a request to switch from the coverage expansion mode to the first mode and transmitting a second egress signal that may be an amplified version of a second ingress signal that may be received over the first bandwidth based on the second mode switch message.

In some examples of the method, apparatuses, and non-transitory computer-readable medium described herein, transmitting the second mode switch message may include operations, features, means, or instructions for transmitting the second mode switch message as a beacon signal.

Some examples of the method, apparatuses, and non-transitory computer-readable medium described herein may further include operations, features, means, or instructions for receiving, from the base station, a mode switch response message that instructs the repeater to operate in the first mode.

In some examples of the method, apparatuses, and non-transitory computer-readable medium described herein, the amplification threshold may be an effective isotropic radiated power (EIRP) threshold.

In some examples of the method, apparatuses, and non-transitory computer-readable medium described herein, the coverage expansion mode may be a frequency selective mode.

In some examples of the method, apparatuses, and non-transitory computer-readable medium described herein, the ingress signal may be received via a carrier having the second bandwidth.

A method of wireless communications by a repeater is described. The method may include transmitting a mode switch message to a base station that indicates a request to switch from a first mode to an interference management mode based on detection that a received signal strength measurement for a received first signal satisfies a signal strength threshold and transmitting, in accordance with the interference management mode, an egress signal that is an amplified version of a beamformed ingress signal based on the mode switch message.

An apparatus for wireless communications by a repeater is described. The apparatus may include a processor, memory coupled with the processor, and instructions stored in the memory. The instructions may be executable by the processor to cause the apparatus to transmit a mode switch message to a base station that indicates a request to switch from a first mode to an interference management mode based on detection that a received signal strength measurement for a received first signal satisfies a signal strength threshold and transmit, in accordance with the interference management mode, an egress signal that is an amplified version of a beamformed ingress signal based on the mode switch message.

Another apparatus for wireless communications by a repeater is described. The apparatus may include means for transmitting a mode switch message to a base station that indicates a request to switch from a first mode to an interference management mode based on detection that a received signal strength measurement for a received first signal satisfies a signal strength threshold and transmitting, in accordance with the interference management mode, an egress signal that is an amplified version of a beamformed ingress signal based on the mode switch message.

A non-transitory computer-readable medium storing code for wireless communications by a repeater is described. The code may include instructions executable by a processor to transmit a mode switch message to a base station that indicates a request to switch from a first mode to an interference management mode based on detection that a received signal strength measurement for a received first signal satisfies a signal strength threshold and transmit, in accordance with the interference management mode, an egress signal that is an amplified version of a beamformed ingress signal based on the mode switch message.

In some examples of the method, apparatuses, and non-transitory computer-readable medium described herein, transmitting the mode switch message may include operations, features, means, or instructions for transmitting the mode switch message as a beacon signal.

Some examples of the method, apparatuses, and non-transitory computer-readable medium described herein may further include operations, features, means, or instructions for receiving, from the base station, a mode switch response message that instructs the repeater to operate in the interference management mode based on the mode switch message.

Some examples of the method, apparatuses, and non-transitory computer-readable medium described herein may further include operations, features, means, or instructions for receiving, from the base station, a mode switch response message that instructs the repeater to operate in the first mode.

Some examples of the method, apparatuses, and non-transitory computer-readable medium described herein may further include operations, features, means, or instructions for receiving, to the repeater, a mode switch response message that instructs the repeater to operate in the first mode.

A method of wireless communications by a base station is described. The method may include receiving a mode switch message from a repeater that indicates a request to switch from a first mode to a coverage expansion mode based on detection that amplification of a first signal received over a first bandwidth does not satisfy an amplification threshold and transmitting, in accordance with the coverage expansion mode, a second signal over a second bandwidth that is narrower than the first bandwidth based on the mode switch message.

An apparatus for wireless communications by a base station is described. The apparatus may include a processor, memory coupled with the processor, and instructions stored in the memory. The instructions may be executable by the processor to cause the apparatus to receive a mode switch message from a repeater that indicates a request to switch from a first mode to a coverage expansion mode based on detection that amplification of a first signal received over a first bandwidth does not satisfy an amplification threshold and transmit, in accordance with the coverage expansion mode, a second signal over a second bandwidth that is narrower than the first bandwidth based on the mode switch message.

Another apparatus for wireless communications by a base station is described. The apparatus may include means for receiving a mode switch message from a repeater that indicates a request to switch from a first mode to a coverage expansion mode based on detection that amplification of a first signal received over a first bandwidth does not satisfy an amplification threshold and transmitting, in accordance with the coverage expansion mode, a second signal over a second bandwidth that is narrower than the first bandwidth based on the mode switch message.

A non-transitory computer-readable medium storing code for wireless communications by a base station is described. The code may include instructions executable by a processor to receive a mode switch message from a repeater that indicates a request to switch from a first mode to a coverage expansion mode based on detection that amplification of a first signal received over a first bandwidth does not satisfy an amplification threshold and transmit, in accordance with the coverage expansion mode, a second signal over a second bandwidth that is narrower than the first bandwidth based on the mode switch message.

In some examples of the method, apparatuses, and non-transitory computer-readable medium described herein, receiving the mode switch message may include operations, features, means, or instructions for receiving the mode switch message as a beacon signal.

Some examples of the method, apparatuses, and non-transitory computer-readable medium described herein may further include operations, features, means, or instructions for transmitting, to the repeater, a mode switch response message that instructs the repeater to operate in the coverage expansion mode based on the mode switch message.

Some examples of the method, apparatuses, and non-transitory computer-readable medium described herein may further include operations, features, means, or instructions for receiving a second mode switch message that indicates a request to switch from the coverage expansion mode to the first mode and transmitting a third signal over the first bandwidth based on the second mode switch message.

In some examples of the method, apparatuses, and non-transitory computer-readable medium described herein, transmitting the second mode switch message may include operations, features, means, or instructions for receiving the second mode switch message as a beacon signal.

Some examples of the method, apparatuses, and non-transitory computer-readable medium described herein may further include operations, features, means, or instructions for transmitting, to the repeater, a mode switch response message that instructs the repeater to operate in the first mode.

In some examples of the method, apparatuses, and non-transitory computer-readable medium described herein, the amplification threshold may be an EIRP threshold.

In some examples of the method, apparatuses, and non-transitory computer-readable medium described herein, the coverage expansion mode may be a frequency selective mode.

In some examples of the method, apparatuses, and non-transitory computer-readable medium described herein, the second signal may be transmitted via a carrier having the second bandwidth.

A method of wireless communications by a base station is described. The method may include receiving a mode switch message from a repeater that indicates a request to switch from a first mode to an interference management mode based on detection that a received signal strength measurement for a received first signal satisfies a signal strength threshold and transmitting, in accordance with the interference management mode, a beamformed signal to the repeater based on the mode switch message.

An apparatus for wireless communications by a base station is described. The apparatus may include a processor, memory coupled with the processor, and instructions stored in the memory. The instructions may be executable by the processor to cause the apparatus to receive a mode switch message from a repeater that indicates a request to switch from a first mode to an interference management mode based on detection that a received signal strength measurement for a received first signal satisfies a signal strength threshold and transmit, in accordance with the interference management mode, a beamformed signal to the repeater based on the mode switch message.

Another apparatus for wireless communications by a base station is described. The apparatus may include means for receiving a mode switch message from a repeater that indicates a request to switch from a first mode to an interference management mode based on detection that a received signal strength measurement for a received first signal satisfies a signal strength threshold and transmitting, in accordance with the interference management mode, a beamformed signal to the repeater based on the mode switch message.

A non-transitory computer-readable medium storing code for wireless communications by a base station is described. The code may include instructions executable by a processor to receive a mode switch message from a repeater that indicates a request to switch from a first mode to an interference management mode based on detection that a received signal strength measurement for a received first signal satisfies a signal strength threshold and transmit, in accordance with the interference management mode, a beamformed signal to the repeater based on the mode switch message.

In some examples of the method, apparatuses, and non-transitory computer-readable medium described herein, receiving the mode switch message may include operations, features, means, or instructions for receiving the mode switch message as a beacon signal.

Some examples of the method, apparatuses, and non-transitory computer-readable medium described herein may further include operations, features, means, or instructions for transmitting, to the repeater, a mode switch response message that instructs the repeater to operate in the interference management mode based on the mode switch message.

DETAILED DESCRIPTION

Figure 1:
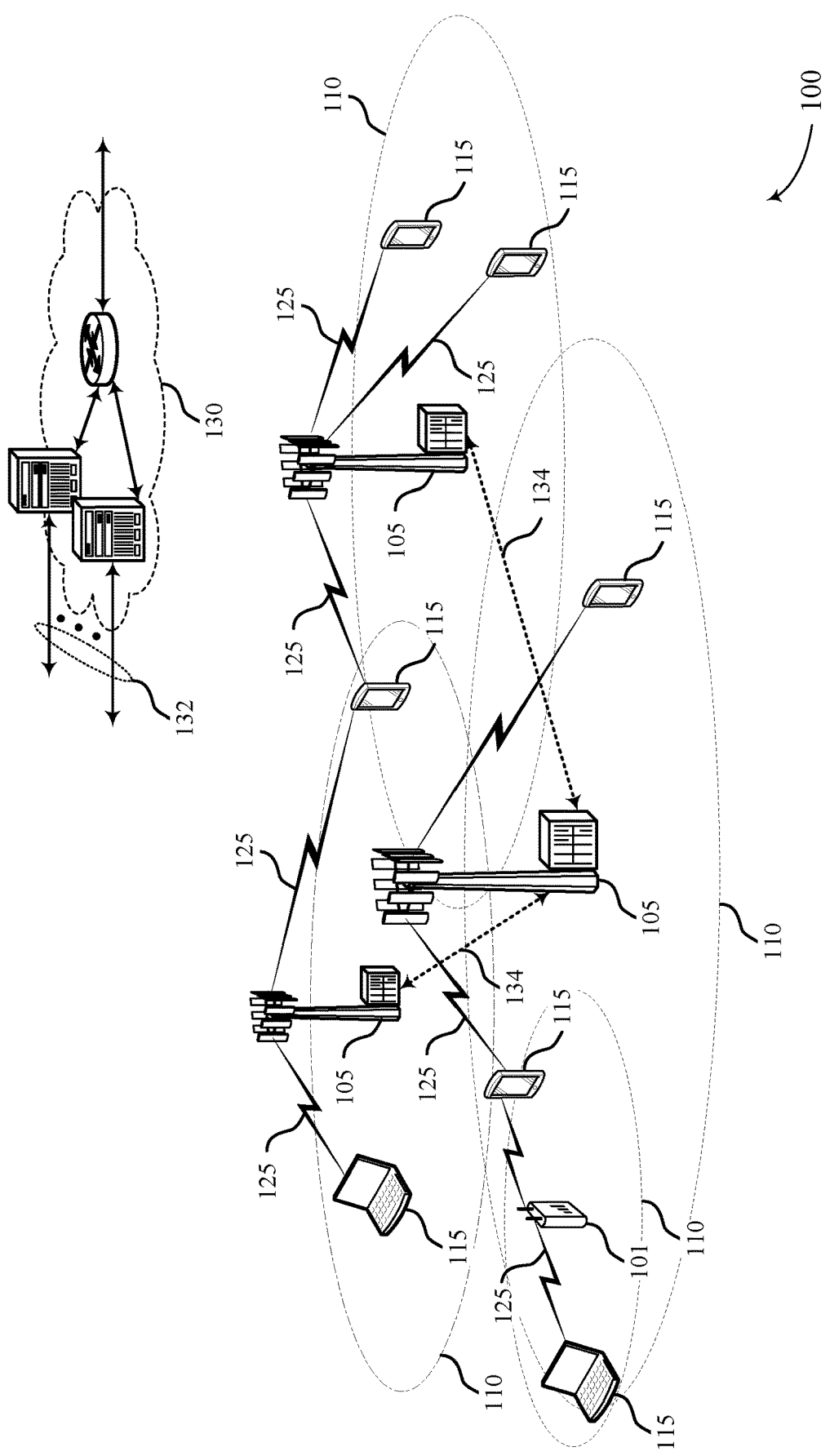
FIG. 1 illustrates an example of a system for wireless communications that supports different operating modes for a repeater in accordance with aspects of the present disclosure.

In some wireless communications systems, a user equipment (UE) may be near the edge or outside of a geographic coverage area of a base station or in a location associated with poor link conditions (e.g., separated from the base station by a physical barrier), and transmissions between the UE and the base station may be received with an insufficiently low received signal strength such that the base station, the UE, or both may be unable to successfully receive and decode the transmissions. Accordingly, repeaters may be employed in the wireless communications systems to assist in supporting the successful reception of transmissions over a communication link between the UE and the base station by receiving a transmitted signal via a receive antenna array and transmitting an amplified version of the signal via a transmit antenna array. However, repeaters may cause interference based on transmitting (e.g., broadcasting) amplified signals.

In some wireless communications systems, repeaters may not be controlled by the network and, accordingly, may cause interference that the network may not control. For example, the network may not have any mechanism to modify a behavior of the repeater to reduce the interference (e.g., interference caused by the repeater or interference present at the repeater due to multiple incoming signals to the repeater). Additionally, in some types of repeaters, coverage from repeaters is fixed and is limited to the maximum effective isotropic radiated power (EIRP) (e.g., a radiated power of the repeater in a direction) of the repeater to amplify a received signal in uplink and downlink directions. If there are some UEs in weak conditions trying to connect to a repeater, the repeater may be unable to sufficiently amplify a received signal such that the signal may be successfully received by the UE. Improved techniques are desired for deploying repeaters in a wireless communications system.

As described herein, a repeater may operate in one of multiple modes and may support communication with the network to enhance repeater performance while managing interference. In some implementations, the repeater may determine that an amplified signal (e.g., an amplified version of a received signal) does not achieve the max EIRP of the repeater, even when the repeater operates at a maximum operating gain, and may transmit a beacon to a base station to signal the base station to switch to a coverage expansion mode. The base station may receive the beacon and, accordingly, may switch to the coverage expansion mode. In some examples, when in the coverage expansion mode, the base station may transmit at a higher power within a narrower bandwidth, which may increase the likelihood of the repeater receiving the signal with improved signal characteristics.

Additionally or alternatively, the repeater may detect a high received signal strength at the inputs of the repeater and may determine that the high received signal strength is caused by interference. The repeater may transmit a beacon to a base station to signal the base station to switch to an interference management mode. In some examples, when in the interference management mode, the base station may use a beamforming operation to transmit a directional signal to the repeater. In some cases, using the beamforming operation to transmit the directional signal to the repeater may reduce the effects of the interference on the signal.

Aspects of the disclosure are initially described in the context of wireless communications systems. Additionally, aspects of the disclosure are illustrated through an additional wireless communications system, an operating mode switch, and process flows. Aspects of the disclosure are further illustrated by and described with reference to apparatus diagrams, system diagrams, and flowcharts that relate to coverage expansion and interference operating modes for a repeater.

FIG. 1 illustrates an example of a wireless communications system 100 that supports different operating modes (e.g., a coverage expansion operating mode, interference management operating mode, etc.) for a repeater in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As shown in wireless communications system 100, a base station 105 and a UE 115 may communicate over a communication link 125. In some cases, the UE 115 may be near the edge or outside of a geographic coverage area 110 of the base station 105 or, in some additional or alternative examples, a location associated with poor link conditions (e.g., separated from the base station 105 by a physical barrier), and transmissions over the communication link 125 may be received with an insufficiently low received signal strength such that the base station 105 or the UE 115, or both, may be unable to successfully receive the transmissions.

In some cases, a repeater, which may be illustrated in wireless communications system 100 as a UE 115 or a repeater 101, may be employed in wireless communications system 100. The repeater may assist in supporting the successful reception of transmissions over a communication link 125 by receiving a transmitted signal via a receive antenna array and transmitting an amplified version of the signal via a transmit antenna array (e.g., bi-directional amplifier). For example, a repeater may receive an ingress signal (e.g., a received signal) from a transmitting device (e.g., a base station 105 or a UE 115) and may transmit an egress signal (e.g., a relayed signal) that is an amplified version of the ingress signal. In this way, repeaters may assist a UE 115 that is at the edge or outside of a geographic coverage area 110 of a base station 105 (e.g., or in a location associated with poor link conditions) to successfully receive a signal transmitted by the base station 105 or to successfully transmit a signal to the base station 105 via an indirect route of the repeater. In some cases, the repeater may increase the effective range of a signal transmitted by a base station 105 or a UE 115 by amplifying the signal strength for receiving devices.

The transmit power (e.g., relay power) of the repeater may be based on an amplification (e.g., an operating gain) of the repeater and based on the received signal strength of the received signal. In some cases, a repeater may receive a signal from a base station 105 or a UE 115, identify the signal strength of the received signal, and determine the amplification of the received signal (e.g., the EIRP at the repeater) that may be achieved by the repeater (e.g., an achievable transmit power).

In some examples described herein, the repeater may be configured with an amplification threshold. In some cases, based on the received power of the received signal and the amplification of the repeater, the repeater may determine that one or more receiving devices may successfully receive the relayed signal based on the achievable transmit power (e.g., achievable EIRP) of the repeater. However, in other cases, the repeater may determine, based on the received power of the received signal and the amplification of the repeater, that the transmit power (e.g., the EIRP) at the repeater for the relayed signal may be less than the amplification threshold. In such cases, the repeater may determine that one or more receiving devices may be unable to successfully receive the relayed signal. The amplification threshold may correspond to a transmit power threshold (e.g., an EIRP threshold) such that if the transmit power at the repeater for a relayed signal is greater than the transmit power threshold, the repeater may determine that one or more receiving devices may successfully receive the relayed signal.

In some systems, base stations 105 may have limited geographical coverage areas 110 due to using beamformed transmissions (e.g., in a mmW system) since the beamformed transmissions are more susceptible to being blocked by various physical barriers (e.g., walls, buildings, people, etc.). Accordingly, repeaters may increase or expand a geographical coverage area 110 of a base station 105 as described herein by amplifying any received signaling before forwarding this amplified signal to a receiving device (e.g., a UE 115), thereby effectively increasing a distance that messages can be transmitted to or from the base station 105. In some cases, the repeaters may simply receive a signal, blindly amplify the signal, and forward the message to a receiving wireless device without decoding the message or processing the message in any way. Additionally or alternatively, in some cases, the repeater may convert a received signal from analog to digital (e.g., or vice-versa) prior to forwarding the amplified message, but no decoding of the message is performed.

However, some repeaters may include a class of repeaters that are not necessarily known by the cellular network (e.g., "ghost" elements). That is, this low cost/low complexity class of repeaters do not establish any sort of a logical connection with other devices within the cellular network and, therefore, do not operate according to the resources and/or configurations provided by the cellular network. Instead, this class of repeaters simply detect a wireless signal, amplify that signal, and then retransmit the signal. Thus, this class of repeaters provides a low cost and simplified mechanism to extend the coverage area of a cellular network, e.g., within buildings or other such structures. In some aspects, wireless communications system 100 may include one or more repeaters 101 deployed and operating within wireless communications system 100. The repeater 101 may be an example of a cell phone signal booster deployed outside of the context of wireless communications system 100 (e.g., may be deployed in an ad hoc manner by end users rather than a network operator associated with wireless communications system 100). The repeater 101 may not establish a logical connectivity at a protocol stack layer with other devices of wireless communications system 100.

Generally, the repeater 101 may receive a signal (e.g., an ingress signal), amplify that signal, and then transmit an amplified version of the signal. These functions are performed without coordination from any cell (e.g., a base station 105), from any core network function of wireless communications system 100, and the like. Additionally, the repeater 101 is not synchronized in the time domain with wireless communications system 100, is not allocated any particular time/frequency/code/spatial resources configured by wireless communications system 100, and the like. Accordingly, the repeater 101 may be deployed without notification, coordination, or control by network operators and/or components/functions of wireless communications system 100. This ad hoc deployment may greatly reduce the costs and/or complexity when deploying a repeater 101. The repeater 101 may be a low complexity device when compared to wireless devices of wireless communications system 100, e.g., may have fewer hardware/software functionality. The repeater 101 may not generally be configured to encode and/or decode the signal, beyond the limited techniques described herein.

However, such ad hoc deployment (e.g., without any sort of network control configuration) of such repeaters with no logical connections to wireless communications system 100 may introduce interference into the cellular network. For example, a higher number of repeaters may be introduced or implemented in wireless communications system 100 for messages transmitted in frequencies used for mmW communications that are more susceptible to signal blockage. Since these repeaters are introduced into wireless communications system 100 in an ad hoc manner, a core network 130 may be unable to control, manage, or coordinate the repeaters, nor do the repeaters necessarily know about other repeaters in wireless communications system 100.

Accordingly, based on this higher deployment of repeaters, a number of issues may arise in wireless communications system 100 without possible management or mitigation by the core network 130. For example, interference (e.g., noise) may occur for uplink transmissions at a base station 105 (e.g., a serving base station or a neighboring base station) based on a high number of repeaters transmitting amplified signals that interfere with each other, and the core network 130 is unable to configure any of the repeaters to reduce their amplification to reduce the interference. Additionally or alternatively, interferences may also occur on downlink transmissions where a first repeater at a first location (e.g., a first house) may interfere with a UE 115 or a second repeater at a second location (e.g., a second house) based on an amplified signal from the first repeater interfering with downlink signals received at the UE 115 and/or the second repeater. In some cases, a repeater may become damaged or may be turned off, and an operator (e.g., the core network 130, an operator monitoring wireless communications system 100 via core network 130, etc.) may be unable to optimize communications in wireless communications system 100 based on not being able to determine when the repeater is turned off or damaged.

As described herein, a smart repeater may be introduced to wireless communications system 100 that is integrated into the network. For example, the smart repeaters may include various relay nodes that operate as repeaters within the cellular network in order to extend the coverage area, provide wireless backhaul services, etc. These relay nodes are sometimes integrated into the network using logical connections, e.g., at the protocol stack layer, and the like. That is, these relay nodes performing repeater operations are generally known by the other components within the cellular network and operate according to full network coordination and control. Deployment and usage of such smart repeaters may implement further definition.

Wireless communications system 100 may support efficient techniques for a repeater (e.g., a smart repeater) to transmit a message (e.g., a mode change request) to a transmitting device (e.g., a base station 105, a UE 115, etc.) requesting for the transmitting device to switch from a current transmission mode to a different transmission mode. For example, the repeater may request the transmitting device to switch to a coverage expansion mode that increases the received power of the signal at the repeater. The transmitting device may receive the message, switch to the coverage expansion mode, and may transmit another signal with different transmission parameters (e.g., an increased transmit power and/or on different frequency resources) than the initially transmitted signal according to the message. The repeater may receive the signal with a second received power, and the second received power of the signal, in combination with the amplification of the repeater, may satisfy an amplification threshold configured for the repeater as described herein. Based on satisfying the amplification threshold, the repeater may transmit an amplified version of the signal to one or more receiving devices.

Additionally or alternatively, the repeater may be configured with a signal strength threshold. In some cases, the repeater may identify that a received signal strength (e.g., a received power) for a received signal exceeds the signal strength threshold and may determine that there is high interference at the inputs of the repeater. Based on determining that the received signal strength of the received signal exceeds the signal strength threshold, the repeater may transmit a message to the transmitting device requesting for the transmitting device to switch to an interference management mode. The transmitting device may receive the message, switch to the interference management mode, and may transmit a beamformed signal to the repeater so that the interference may not have as great an effect on the signal. The repeater may receive the beamformed signal and transmit an amplified version of the beamformed signal to one or more receiving devices.

Figure 2:
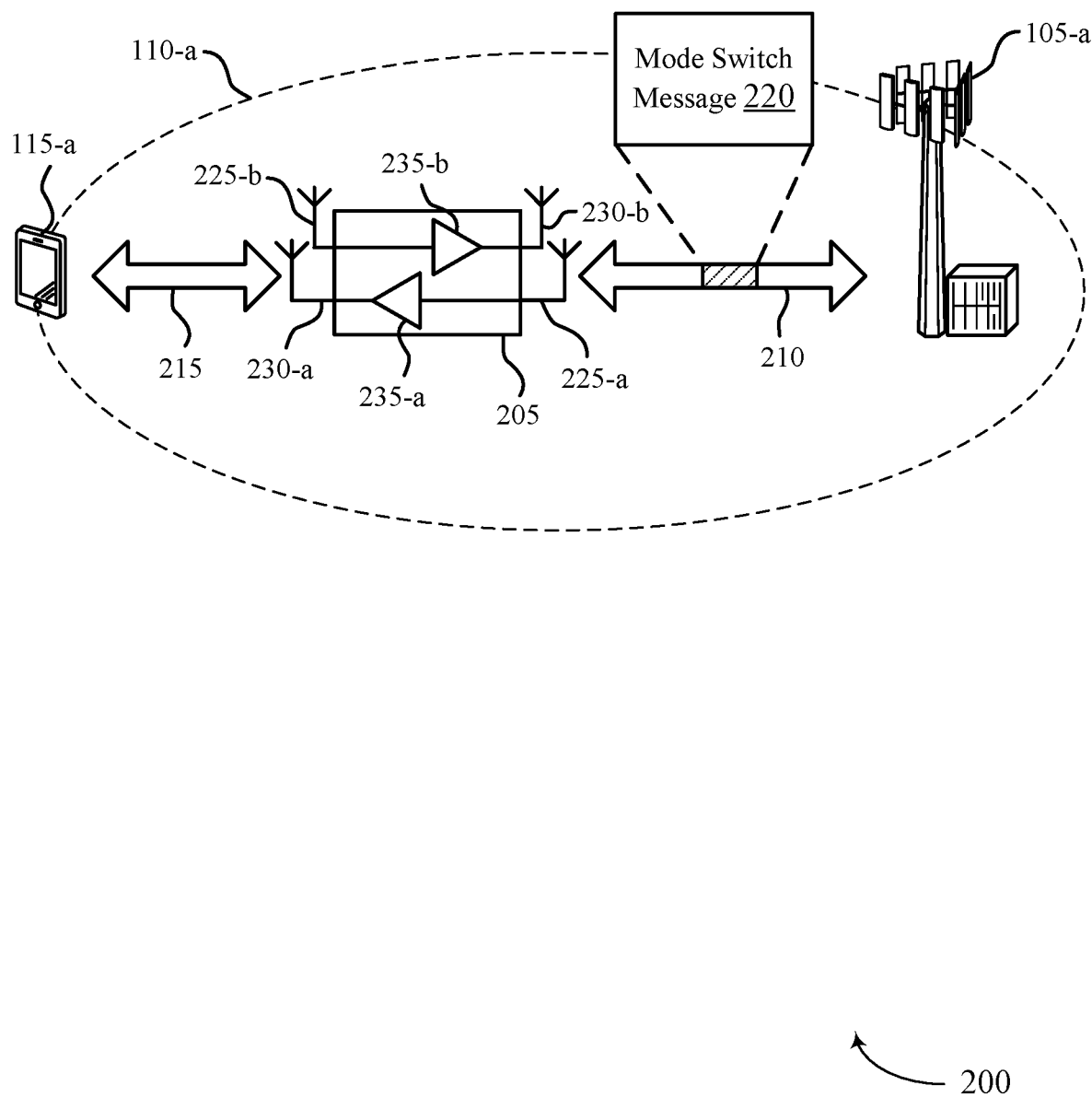
FIG. 2 illustrates an example of a wireless communications system that supports different operating modes for a repeater in accordance with aspects of the present disclosure.

FIG. 2 illustrates an example of a wireless communications system 200 that supports different operating modes (e.g., a coverage expansion operating mode, interference management operating mode, etc.) for a repeater in accordance with aspects of the present disclosure. In some examples, wireless communications system 200 may implement aspects of wireless communications system 100. For example, wireless communications system 200 may include a UE 115-a and a base station 105-a which may be examples of UEs 115 and base stations 105, respectively, as described with reference to FIG. 1. Additionally, base station 105 a may be associated with a geographic coverage area 110 a as described with reference to FIG. 1.

In some cases, the base station 105-a and the UE 115-a may not successfully communicate over a direct communication link. For example, the UE 115-a may be at the edge or outside of the geographic coverage area 110-a such that a communication link between the base station 105-a and the UE 115-a may be associated with significant path and propagation losses (e.g., that may lower the received power of the signal, decrease the quality of the signal, etc.). As such, the base station 105-a and the UE 115-a may not have sufficient power allocations to transmit and receive signaling over a direct link between the UE 115-a and the base station 105-a.

Accordingly, to mitigate the path and propagation losses, a repeater 205 may act as a relay node for communication between the UE 115-a and the base station 105-a such that the base station 105-a may communicate with the UE 115-a via the repeater 205. In some examples, the base station 105-a may transmit a signal, and the repeater 205 may receive the signal over a communication link 210. The repeater 205 may transmit an amplified version of the signal and, in some cases, the amplified version of the signal may be received by the UE 115-a over a communication link 215.

In a similar manner, the UE 115-a may transmit a signal and the repeater 205 may receive the signal over the communication link 215. The repeater 205 may transmit an amplified version of the signal, and, in some cases, the base station 105-a may receive the amplified version of the signal over the communication link 210. As such, the repeater 205 may support communication between two wireless devices that may be unable to communicate over a direct link by amplifying the signal strength of the transmission and, accordingly, increasing the effective transmission range of a signal from a transmitting device.

The repeater 205 may be configured to receive an input signal (e.g., an ingress signal) via a receive antenna array 225 and may transmit an output signal (e.g., an egress signal) via a transmit antenna array 230. In some cases, the repeater 205 may have two antenna arrays on each end of the repeater 205 for a transmission direction, where at each end of the repeater 205 one antenna array may be a receive antenna array 225 and the other may be a transmit antenna array 230. In such cases, the repeater 205 may be capable of receiving and transmitting at both ends of the repeater device (e.g., may support two-way relay operations, such as bi-directional operations where repeater 205 is a bi-directional amplifier or bi-directional repeater). For example, the repeater 205 may receive a signal from the base station 105-a over the communication link 210 via a receive antenna array 225-a and may transmit an amplified version of the signal over the communication link 215 via a transmit antenna array 230-a (e.g., towards the UE 115-a). Additionally or alternatively, the repeater 205 may receive a signal from the UE 115-a over the communication link 215 via a receive antenna array 225-b and may transmit an amplified version of the signal over the communication link 210 via a transmit antenna array 230-b (e.g., towards the base station 105-a).

Additionally, the repeater 205 may operate at one or more gains. For example, a repeater may receive a signal from the base station 105-a and may amplify the signal (e.g., using an amplifier 235) according to the one or more gains. As such, an amplifier 235 of the repeater 205 may be configured to one or more operating gains to amplify a signal along its path, where a higher operating gain may result in a greater amplification of the signal.

The transmit power (e.g., the EIRP) of the repeater 205 may depend on the gain at which the amplifiers 235 are operating and the signal strength (e.g., the received power) of the signal received from the base station 105-a and/or the UE 115-a. Accordingly, the repeater 205 may achieve a transmit power towards the UE 115-a based on a received signal strength from the base station 105-a and the operating gain of the amplifiers 235. For example, the repeater 205 may receive a signal via receive antenna array 225-a, amplify the received signal with amplifier 235-a, and transmit an amplified version of the received signal (e.g., a relayed signal) via transmit antenna array 230-a towards the UE 115-a. Additionally or alternatively, the repeater 205 may achieve a transmit power towards the base station 105-a based on a received signal strength from the UE 115-a and the operating gain of the amplifiers 235, where the repeater 205 receives a signal via receive antenna array 225-b, amplifies the received signal with amplifier 235-b, and transmits an amplified version of the received signal (e.g., a relayed signal) via transmit antenna array 230-b towards the base station 105-a.

Accordingly, the UE 115-a may receive the relayed signal from the repeater 205 over the communication link 215 based on the transmit power towards the UE 115-a achieved by the repeater 205. If the transmit power of the repeater 205 is not sufficient (e.g., is too low), the UE 115-a may be unable to successfully receive the amplified signal (e.g., due to low signal strength, a poor signal to noise ratio (SNR), etc.). In some cases, the repeater 205 may increase the operating gain of the amplifiers 235 to increase the transmit power achieved towards the UE 115-a. However, increasing the gain of the amplifiers 235 may lead to interference problems at the inputs of the repeater 205. Additionally, in some cases, the amplifiers 235 may already be operating at their maximum gain. In such cases, the repeater 205 may receive the signal from the base station 105-a with an insufficiently low signal strength such that, even when operating at a maximum operating gain, the repeater 205 may be unable to amplify the signal to achieve a transmit power threshold towards the UE 115-a (e.g., a transmit power at which the UE 115-a may successfully receive the relayed signal).

In some implementations of the present disclosure, the repeater 205 may determine an amplification threshold (e.g., the transmit power threshold or an EIRP threshold) that may enable the repeater 205 to successfully relay a received signal from a transmitting device (e.g., from the base station 105-a) to a receiving device (e.g., the UE 115-a). The amplification threshold may be based on the link (e.g., the communication link 215) between the repeater 205 and the receiving device and may be preconfigured on the repeater 205 or the receiving device may periodically or aperiodically (e.g., when link conditions change) indicate the amplification threshold to the repeater 205. In some examples, the repeater 205 may use the amplification threshold to determine if a received signal strength is sufficient based on the operating gain of the amplifiers 235.

It is noted that although the examples provided above and herein are described in the context of the base station 105-a serving as the transmitting device (e.g., transmitting the signal) and the UE 115-a as the receiving device (e.g., receiving the relayed signal from the repeater 205), the examples are equally applicable in a reverse setup where the UE 115-a is the transmitting device and the base station 105-a is the receiving device. Additionally, the techniques described herein are not limited to communication between a UE 115 and a base station 105 and are equally applicable to communication between any two communicating devices.

In some cases, the base station 105-a may transmit a signal for the UE 115-a, and the repeater 205 may receive the signal and transmit an amplified version of the signal towards the UE 115-a. In some examples, the UE 115-a may signal to the repeater 205 to indicate the amplification threshold (e.g., a minimum transmit power or EIRP at the repeater 205 towards the UE 115-a) that may enable the relay to be successful. The UE 115-a may signal the amplification threshold to the repeater 205 periodically or aperiodically. In examples where the UE 115-a signals the amplification threshold aperiodically, the UE 115-a may update the amplification threshold based on changing link conditions. Additionally or alternatively, the repeater 205 may be preconfigured with the amplification threshold.

In some examples, the repeater 205 may receive the signal transmitted from the base station 105-a and may determine whether the signal satisfies the amplification threshold. For example, the repeater 205 may identify a received signal strength of the signal received from the base station 105-a and may determine whether the repeater 205 can sufficiently amplify the received signal to satisfy the amplification threshold. Sufficiently amplifying the received signal may include determining that an operating gain of the amplifier 235-a may amplify the signal such that the repeater 205 achieves a transmit power (e.g., an EIRP) towards the UE 115-a that is sufficiently large to enable the UE 115-a to successfully receive the amplified signal transmitted from the repeater 205.

Additionally or alternatively, the repeater 205 may receive a signal with a received signal strength from the base station 105-a over the communication link 215 and may detect that an operating gain (e.g., a maximum operating gain of the amplifier 235-a) may not amplify the signal enough to satisfy the amplification threshold. In such examples, even at a maximum operating gain, the repeater 205 may be unable to achieve a transmit power towards the UE 115-a over the communication link 215 that enables the UE 115-a to successfully receive the signal (e.g., due to a low signal strength at the UE 115-a, poor SNR, etc.). For example, the repeater 205 may apply a gain (e.g., max repeater gain) to an ingress signal from base station 105-a or UE 115-a, but, due to the weak ingress signal, a defined egress signal level (e.g., max EIRP) may not be achieved. Additionally or alternatively, the repeater 205 may determine that one or more other signal characteristics of the received signal (e.g., SNR, signal-to-interference-plus-noise ratio (SINR), etc.) may be insufficient for the UE 115-a to successfully receive an amplified version of the signal.

As described herein, the repeater 205 may determine that the amplification (e.g., a maximum amplification the amplifier 235-a or a maximum amplification that may avoid increasing interference at the inputs of the repeater 205) of the signal received from the base station 105-a does not satisfy the amplification threshold. Accordingly, the repeater 205 may transmit a message (e.g., a mode switch message 220) to the base station 105-a based on the amplification of the signal not satisfying the amplification threshold. In some examples, the mode switch message 220 may be a beacon message and may request for the base station 105-a to modify one or more transmission parameters of the signal that may expand the coverage of the base station 105-a. For example, the mode switch message 220 may request the base station 105-a to switch to a coverage expansion mode based on the amplification of the signal not satisfying the amplification threshold. As such, for the coverage expansion mode, the repeater 205 may request the base station 105-a to increase a transmission power. Additionally or alternatively, the mode switch message 220 may request the base station 105-a to switch to a frequency selective mode. For example, the mode switch message 220 may request the base station 105-*a* to modify a frequency resource of the transmission.

In some cases, the base station 105-*a* may transmit the signal (hereinafter referred to as a first signal) using a first set of transmission parameters including a first frequency resource, and the repeater 205 may request, via the mode switch message 220 and based on the amplification of the signal not satisfying the amplification threshold, for the base station 105-*a* to transmit a second signal with a second set of transmission parameters including a second frequency resource. In some examples (e.g., based on the amplification of the first signal not satisfying the amplification threshold), the repeater 205 may transmit the mode switch message 220 to the base station 105-*a* to request the base station 105-*a* to modify the frequency resource used by the base station 105-*a* to reduce the interference, path or propagation losses, fading, or a combination thereof, that the first signal experiences over the communication link 210. For example, the mode switch message 220 may request the base station 105-*a* to use a narrower band, select channels including frequencies (e.g., frequency blocks) associated with less fading, use fewer frequency carriers, or a combination thereof.

Additionally or alternatively, based on transmitting the mode switch message 220, the repeater 205 may receive, from the base station 105-*a*, a response message (e.g., a mode switch response message) that may instruct the repeater 205 to operate according to the requested set of modified transmission parameters. Accordingly, the repeater 205 may modify its configuration to operate in the coverage expansion mode. For example, the repeater 205 may receive the second signal with an increased transmit power, a narrower band, select channels including frequencies (e.g., frequency blocks) associated with less fading, fewer frequency carriers, or a combination thereof. Additionally, the repeater 205 may receive the second signal with a signal strength such that, after amplification by an operating gain of the amplifier 235, the amplification of the second signal may satisfy the amplification threshold. As such, the repeater 205 may transmit an amplified version of the second signal towards the UE 115-*a* with a transmit power that may enable the UE 115-*a* to successfully receive the relayed second signal.

In some cases, the repeater 205 may transmit a second mode switch message 220 to the base station 105-*a* to request the base station 105-*a* to switch back to the first set of transmission parameters including the first frequency resource. In some examples, the repeater 205 may determine to transmit the second mode switch message 220 based on successfully relaying the second signal to the UE 115-*a*. Additionally or alternatively, the repeater 205 may determine to transmit the second mode switch message 220 based on receiving a signal from the UE 115-*a* indicating an updated amplification threshold (e.g., based on new link conditions over the communication link 215).

Additionally or alternatively, the repeater 205 may be configured with a signal strength threshold. In some examples, the repeater 205 may determine that the signal strength of a received signal (e.g., based on a received signal strength indicator (RSSI)) at the inputs of the repeater 205 (e.g., at the receive antenna array 225-*a*) may exceed the signal strength threshold. Based on determining the signal strength indication (e.g., the RSSI) exceeds the signal strength threshold for a received signal, the repeater 205 may determine that interference levels are potentially high at the receive antenna arrays 225 of the repeater 205. As such, a signal received by the repeater 205 from the base station 105-*a* may experience high interference levels (e.g., may be received with poor signal quality) and may be associated with low signal strength, poor SNR, etc. In some examples, the repeater 205 may transmit an amplified version of the signal to the UE 115-*a*. However, in some cases, despite the high signal strength received by the repeater 205, the interference at the inputs of the repeater 205 may cause the relayed signal to have poor signal quality (e.g., poor SNR). In some examples, due to the poor signal quality, the UE 115-*a* may be unable to successfully receive the relayed signal.

Accordingly, the repeater 205 may transmit the mode switch message 220 to the base station 105-*a* based on the signal strength indication (e.g., the RSSI) at the inputs of the repeater 205 exceeding the signal strength threshold. The mode switch message 220 may indicate to the base station 105-*a* that the repeater 205 is experiencing high interference levels at the inputs of the repeater 205 and may request the base station 105-*a* to modify the transmission of the signal. For example, in such a case, the mode switch message 220 may request the base station 105-*a* to switch to an interference management mode such that the base station 105-*a* modifies the transmission of the signal to minimize the influence of the interference at the inputs of the repeater 205.

In some examples, based on receiving the mode switch message 220 requesting the base station 105-*a* to switch to an interference management mode, the base station 105-*a* may determine to transmit a beamformed signal to the repeater 205. Accordingly, the base station 105-*a* may transmit the signal with more directional power and with reduced susceptibility to the interference. Additionally or alternatively, the base station 105-*a* may transmit the mode switch response message to the repeater 205 instructing the repeater 205 to operate according to the requested transmission mode (e.g., beamforming). Based on receiving the mode switch response message, the repeater may modify its operation according to the instructions of the base station 105-*a*. For example, the repeater 205 may modify its configuration to operate in the interference management mode.

The base station 105-*a* may transmit a beamformed signal to the repeater 205, and the repeater 205 may receive the beamformed signal based on the instructions received in the mode switch response message. Subsequently, the repeater 205 may transmit an amplified version of the beamformed signal to the UE 115-*a*. Thus, in high interference conditions, the repeater 205 may determine that the UE 115-*a* may successfully receive the relayed signal based on transmitting an amplified version of a received beamformed signal (e.g., that may be less susceptible to the interference). In some examples, the base station 105-*a* may transmit a second mode switch response message instructing the repeater 205 to return to the original transmission mode after successfully transmitting the amplified beamformed signal to the UE 115-*a* in the interference management mode.

Figure 3:
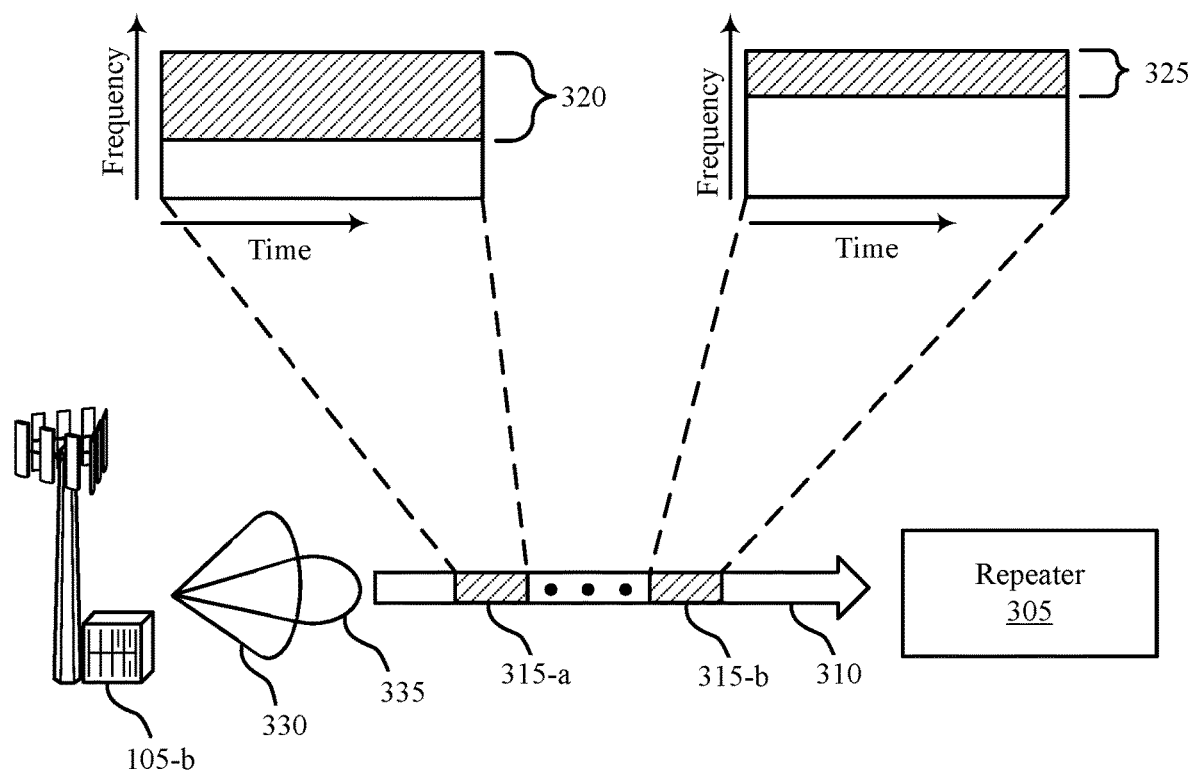
FIG. 3 illustrates an example of an operating mode switch that supports different operating modes for a repeater in accordance with aspects of the present disclosure.

FIG. 3 illustrates an example of an operating mode switch 300 that supports different operating modes (e.g., a coverage expansion operating mode, interference management operating mode, etc.) for a repeater 305 in accordance with aspects of the present disclosure. In some examples, operating mode switch 300 may implement aspects of wireless communications systems 100 and/or 200. In some examples, operating mode switch 300 may include a base station 105-*b* and a repeater 305, which may be examples of a base station 105 and a repeater 205, respectively, as described herein with reference to FIGS. 1 and 2. Additionally, a communication link 310 may connect the base station 105-*b* and the repeater 305 for carrying signals or messages to and from either communications device. In some examples, the repeater 305 may function as a relay and may transmit an amplified version of a signal received from the base station 105-b to a receiving device, such as a UE 115 or another wireless communications device.

As described herein with reference to FIG. 2, the repeater 305 may transmit a message (e.g., a mode switch message) to the base station 105-b to request the base station 105-b to switch one or more transmission parameters or a transmission mode based on comparing a received signal to a threshold. In some examples, the base station 105-b may transmit a first signal 315-a prior to receiving a mode switch message and may transmit a second signal 315-b after, and in accordance with, receiving the mode switch message.

In some cases, the base station 105-b may transmit the first signal 315-a and the second signal 315-b to the repeater 305 over the communication link 310. Subsequently, the repeater 305 may receive the first signal 315-a and may determine an amplification of the first signal 315-a with an operating gain (e.g., a maximum operating gain) of the repeater 305 does not satisfy an amplification threshold. For example, the repeater 305 may amplify the first signal 315-a or the second signal 315-b with the operating gain of the repeater 305 and achieve a transmit power (e.g., an EIRP) towards the receiving device that is lower than a transmit power threshold (e.g., an EIRP threshold), indicating that the receiving device may be unable to successfully receive the relayed signal (e.g., due to a low received signal strength, poor SNR, etc., at the receiving device). In such examples, the repeater 305 may determine to request the base station 105-b to switch to a coverage expansion mode and to modify one or more transmission parameters which the base station may use to transmit the second signal 315-b.

For example, the base station 105-b may transmit the first signal 315-a with a first set of transmission parameters including a first frequency resource 320 (e.g., a first set of allocated frequencies, a first subband, a first bandwidth, etc.). However, based on determining that the amplification of the first signal 315-a received over the first frequency resource 320 does not satisfy the amplification threshold, the repeater 305 may request the base station 105-b to switch to a coverage expansion mode. For instance, the repeater 305 may receive the first signal 315-a transmitted over the first frequency resource 320 with a first received power. The repeater 305 may then determine that the first received power of the first signal 315-a over the first frequency resource 320 is insufficient based on amplifying the first received power by an operating gain of the repeater 305 and determining the amplified version of the first signal 315-a is less than the amplification threshold. Additionally or alternatively, the repeater 305 may determine that one or more other signal characteristics (e.g., SNR, SINR, etc.) may be insufficient for the receiving device to successfully receive the amplified version of the first signal 315-a.

Based on determining the receiving device may be unable to receive an amplified version of the first signal 315-a, the repeater 305 may transmit the mode switch message to the base station 105-b requesting the base station to modify one or more transmission parameters (e.g., switch to the coverage expansion mode). In some examples, the mode switch message may request the base station 105-b to modify the frequency resources used to transmit the first signal 315-a (e.g., the first frequency resource 320). For example, the repeater 305 may request the base station 105-b to use a narrower bandwidth, select channels including frequencies (e.g., frequency blocks) associated with less fading, fewer frequency carriers, or a combination thereof. In some cases, the repeater 305 may request the base station 105-b to use a frequency resource based on the frequency resources the repeater 305 is using to transmit towards a receiving device. Additionally or alternatively, the repeater 305 may request the base station 105-b to use frequency resources that are different than the frequency resources used by the transmit end of the repeater 305 to reduce interference at the inputs of the repeater 305 (e.g., reduce port-to-port interference).

Based on receiving the mode switch message, the base station 105-b may switch to the coverage expansion mode and may determine to modify one or more transmission parameters when transmitting the second signal 315-b. Accordingly, the base station 105-b may transmit the second signal 315-b to the repeater 305 according to the coverage expansion mode. For example, the base station 105-b may transmit the second signal 315-b with one or more modified transmission parameters such that the effective transmission range of the second signal 315-b increases and such that the received signal strength of the second signal 315-b at the repeater 305 enables the repeater 305 to satisfy the amplification threshold for the receiving device.

In some examples, the base station 105-b may determine to transmit the second signal 315-b with modified frequency resources, such as a narrower bandwidth, select channels including frequencies (e.g., frequency blocks) associated with less fading, fewer frequency carriers, or a combination thereof. Accordingly, the base station 105-b may transmit the second signal 315-b with a second frequency resource 325 (e.g., a second bandwidth). The second frequency resource 325 may be an example of a narrower bandwidth, a select channel including frequencies (e.g., frequency blocks) associated with less fading, fewer frequency carriers, or a combination thereof when compared to the first frequency resource 320. The repeater 305 may receive the second signal 315-b over the second frequency resource 325 and may determine that an amplification of the second signal 315-b satisfies the amplification threshold. Accordingly, the repeater 305 may transmit (e.g., relay) an amplified version of the second signal 315-b, which may be successfully received by the receiving device.

Additionally or alternatively, in other examples, the repeater 305 may determine that the received signal strength of the first signal 315-a exceeds a signal strength threshold. For example, the repeater 305 may determine that there may be high levels of interference when a signal strength indication (e.g., an RSSI) at the inputs of the repeater 305 is above the signal strength threshold. As such, the quality of the first signal 315-a may be adversely affected by the interference, and the repeater 305 may determine that a receiving device may be unable to successfully receive the relayed signal (e.g., due to a poor SNR, SINR, etc., at the repeater 305). Accordingly, in such examples, the repeater 305 may determine to request the base station 105-b to switch to an interference management mode for the base station 105-b and the repeater 305 to switch to a different transmission mode corresponding to the interference management mode, which the transmitting device may use to transmit the second signal 315-b.

In some examples, the base station 105-b may transmit the first signal 315-a in a first transmission mode (e.g., not using beamforming) in which the first signal 315-a may be susceptible to interference. For example, the base station 105-b may transmit the first signal 315-a with a first beam 330 that is not beamformed towards the repeater 305. The base station 105-b may receive the mode switch message from the repeater 305 and determine that the first transmission mode may be insufficient for transmissions to the receiving device via the repeater 305. Based on receiving the mode switch message from the repeater 305, the base station 105-*b* may determine to switch to the interference management mode.

Accordingly, the base station 105-*b* may switch to the interference management mode and use a different transmission mode (e.g., using beamforming) to transmit the second signal 315-*b* than the transmission mode (e.g., not using beamforming) used to transmit the first signal 315-*a*. For example, the base station 105-*b* may switch to the interference management mode and determine to transmit the second signal 315-*b* using beamforming towards the repeater 305. Additionally, the base station 105-*b* may transmit instructions received by the repeater 305 for the repeater 305 to operate according to the interference management mode (e.g., according to the beamforming of the second signal 315-*b*). The repeater 305 may receive the instructions and configure itself to operate in the interference management mode (e.g., operate in a manner to receive the second signal 315-*b* that has been beamformed).

In some examples, as shown, the base station 105-*b* may transmit the second signal 315-*b* with a second beam 335 that is beamformed towards the repeater 305. In some cases, the second signal 315-*b*, using the second beam 335 that is beamformed towards the repeater 305, may be less susceptible to interference over the link 310 and at the inputs of the repeater 305 (e.g., based on the beamforming). For example, the second beam 335 may be narrower than the first beam 330, such that the second signal 315-*b* is more focused and transmitted at a higher power in a particular direction (e.g., towards the repeater 305) and with a higher signal quality than the first signal 315-*a* transmitted in a wider area. The repeater 305 may receive the second signal 315-*b* from the base station 105-*b* and may determine, based on receiving the second signal 315-*b* transmitted with the second beam 335 that was beamformed towards the repeater 305, that the second signal 315 may have a sufficient signal quality (e.g., SNR, SINR, etc.), such that the receiving device may successfully receive an amplified version of the second signal 315-*b*.

It is noted that although the examples provided above and herein are described in the context of the base station 105-*b* serving as the transmitting device (e.g., transmitting the signal) and a UE 115 as the receiving device (e.g., receiving the relayed signal from the repeater 305), the examples are equally applicable in a reverse setup where the UE 115 is the transmitting device and the base station 105-*b* is the receiving device. Additionally, the techniques described herein are not limited to communication between a UE 115 and a base station 105 and are equally applicable to communication between any two communicating devices.

Figure 4:
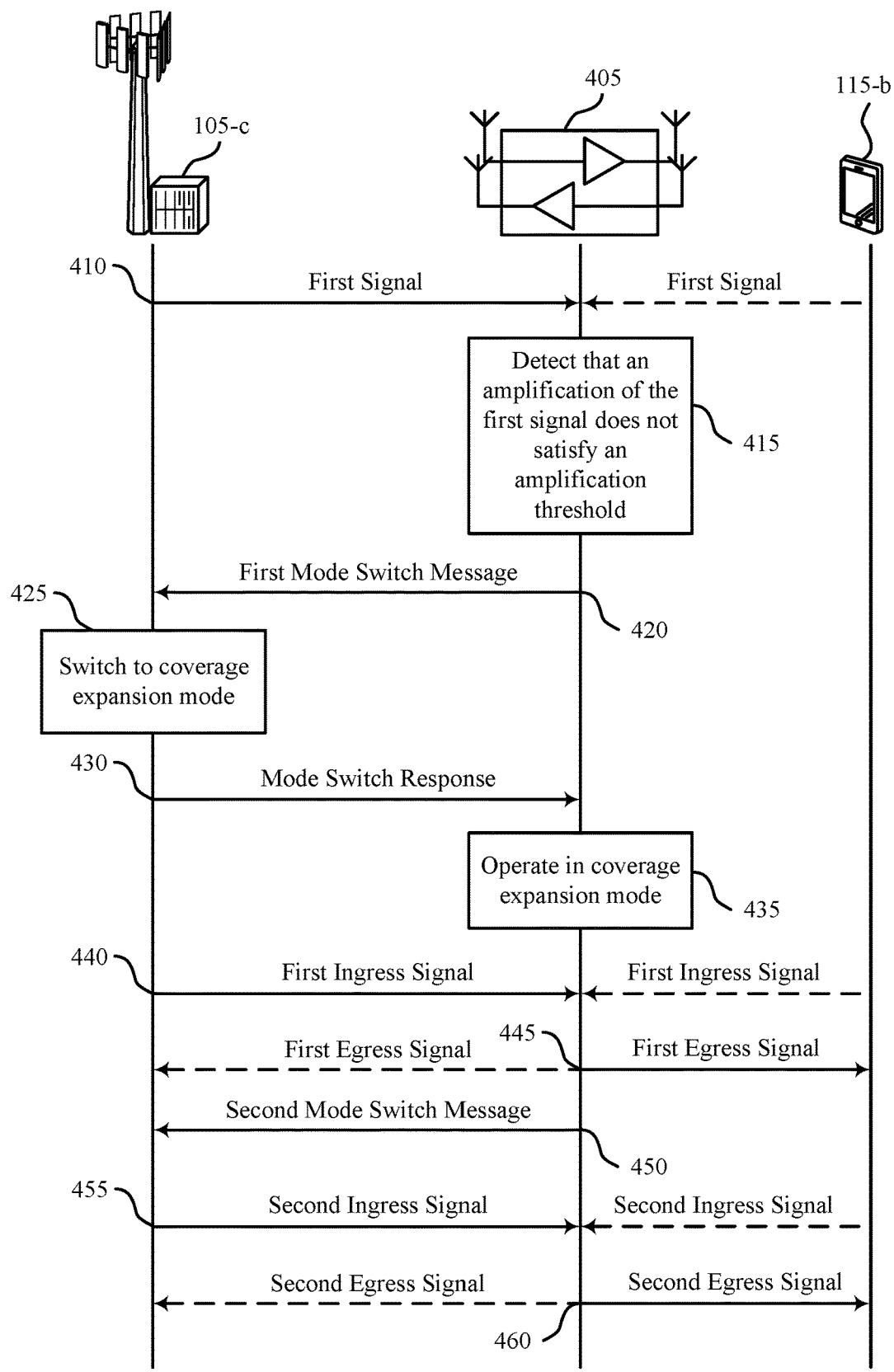
FIGS. 4 and 5 illustrate examples of process flows that support different operating modes for a repeater in accordance with aspects of the present disclosure.

FIG. 4 illustrates an example of a process flow 400 that supports different operating modes (e.g., a coverage expansion operating mode, interference management operating mode, etc.) for a repeater in accordance with aspects of the present disclosure. In some examples, process flow 400 may implement aspects of wireless communications systems 100 and/or 200. Process flow 400 may include a base station 105-*c*, a UE 115-*b*, and a repeater 405, which may be examples of the corresponding communications devices as described herein with reference to FIGS. 1-3. Accordingly, the repeater 405 may be used to forward and amplify messages or signals transmitted between the base station 105-*c* and the UE 115-*b*.

In the following description of the process flow 400, the operations between the base station 105-*c*, the UE 115-*b*, and the repeater 405 may be transmitted in a different order than the exemplary order shown, or the operations performed by the base station 105-*c*, the UE 115-*b*, and the repeater 405 may be performed in different orders or at different times. Some operations may also be left out of the process flow 400, or other operations may be added to the process flow 400. It is to be understood that while the base station 105-*c*, the UE 115-*b*, and the repeater 405 are shown performing a number of the operations of process flow 400, any wireless device may perform the operations shown.

At 410, the repeater 405 may receive a first signal (e.g., from the base station 105-*c* or the UE 115-*b*). In some examples, the base station 105-*c* or the UE 115-*b* may transmit the first signal to the repeater 405 such that the repeater 405 may receive the first signal and transmit an amplified version of the first signal to the UE 115-*b* or the base station 105-*c*, respectively. Additionally, the repeater 405 may receive the first signal over a first bandwidth.

At 415, however, the repeater 405 may detect that an amplification of the first signal may not satisfy an amplification threshold (e.g., an EIRP threshold). In some examples, the repeater 405 may identify an operating gain of the repeater 405 and determine that the amplification of the first signal that the repeater 405 may achieve based on its operating gain and the received signal strength of the first signal. The repeater 405 may compare the amplification of the first signal to the amplification threshold and may determine the amplification of the first signal does not satisfy the amplification threshold. In such cases, the repeater 405 may determine the amplification of the signal is insufficient to enable a receiver (e.g., the UE 115-*b* or the base station 105-*c*) to receive the amplified version of the first signal. In some examples, the repeater 405 may additionally determine that the amplification threshold may be satisfied if the base station 105-*c* modifies one or more transmission parameters of the first signal (e.g., modifies a transmit power or a frequency resource of the first signal).

At 420, the repeater 405 may transmit a first mode switch message to the base station 105-*c* to request the base station 105-*c* to modify the one or more transmission parameters such that the repeater 405 may receive a signal with a received power and/or signal quality that may enable the repeater 405 to satisfy the amplification threshold. For example, the repeater 405, may transmit the first mode switch message to the base station 105-*c* that indicates a request to switch from a first mode to a coverage expansion mode based on detection that amplification of the first signal received over the first bandwidth does not satisfy the amplification threshold. In some examples, the mode switch message may request the base station 105-*c* to switch to a coverage expansion mode. Additionally, the coverage expansion mode may be a frequency selective mode. In some cases, the repeater 405 may transmit the first mode switch message as a beacon signal.

At 425, the base station 105-*c* (e.g., and the UE 115-*b*) may switch to the coverage expansion mode based on receiving the first mode switch message at 420. In some examples, switching to the coverage expansion mode may include modifying one or more transmission parameters (e.g., of the base station 105-*c* and the UE 115-*b*). For example, the base station 105-*c* and/or the UE 115-*b* may switch to the coverage expansion mode and may determine to modify its transmissions to use an increased transmission power and/or a different frequency resource than the frequency resource used to transmit the first signal. In some examples, the different frequency resource may include a narrower bandwidth, a select channel including frequencies (e.g., frequency blocks) associated with less fading, fewer frequency carriers, or a combination thereof.

At 430, the base station 105-*c* may transmit a mode switch response to the repeater 405 to instruct the repeater 405 to operate in the coverage expansion mode based on the first mode switch message transmitted at 420.

At 435, the repeater 405 may operate in the coverage expansion mode based on the instructions received from the base station 105-*c* at 430.

At 440, the repeater 405 may receive a first ingress signal (e.g., from the base station 105-*c* or from the UE 115-*b*). In some examples, the first ingress signal may be transmitted according to the transmission parameters of the coverage expansion mode (e.g., with a higher transmit power and/or a different frequency resource than was used to transmit the first signal). Similarly, the repeater 405 may receive the first ingress signal based on operating in the coverage expansion mode. In some examples, the base station 105-*c* or the UE 115-*b* may transmit the first ingress signal to the repeater 405 so that the repeater 405 may relay an amplified version of the first ingress signal to the UE 115-*b* or the base station 105-*c*, respectively. Additionally, the first ingress signal may be received over a second bandwidth that is narrower than the first bandwidth based on the first mode switch message. In some cases, the first ingress signal may be received via a carrier having the second bandwidth.

At 445, the repeater 405 may transmit, in accordance with the coverage expansion mode, a first egress signal that is an amplified version of an ingress signal received at 440. For example, the repeater 405 may transmit the first egress signal to the UE 115-*b* or to the base station 105-*c*. In some examples, the repeater 405 may determine that the first ingress signal was received with a sufficient signal strength and/or a sufficient signal quality (e.g., SNR, etc.) such that an amplified version of the first ingress signal (e.g., the egress signal) may satisfy the amplification threshold. Based on the egress signal satisfying the amplification threshold, the repeater 405 may determine that the UE 115-*b* may successfully receive the egress signal.

At 450, the repeater 405 may transmit a second mode switch message to the base station 105-*c* that indicates a request to switch from the coverage expansion mode to the first mode. For example, the second mode switch message may request the base station 105-*c* to return to an operation mode used previously (e.g., an initial mode, a default mode, etc. that may have been used to transmit the first signal). In some examples, the repeater 405 may transmit the second mode switch message based on successfully relaying the first ingress signal to the UE 115-*b*. Additionally or alternatively, the repeater 405 may transmit the second mode switch message based on receiving an indication from the UE 115-*b* that the amplification threshold has changed (e.g., that link conditions of the communication link between the repeater 405 and the UE 115-*b* have changed). Additionally, the repeater 405 may transmit the second mode switch message for any other suitable reason. In some cases, the repeater 405 may transmit the second mode switch message as a beacon signal. Additionally, based on transmitting the second mode switch message, the repeater 405 may receive, from base station 105-*c*, a mode switch response message that instructs the repeater to operate in the first mode.

At 455, the repeater 405 may receive a second ingress signal (e.g., from the base station 105-*c* or the UE 115-*b*). In some cases, the second ingress signal may be transmitted and received using similar transmission parameters used to transmit the first signal at 410 (e.g., over the first bandwidth). For example, the repeater 405 may receive the second ingress signal in the initial, default, etc. operation mode (e.g., from the base station 105-*c* or from the UE 115-*b*).

At 460, the repeater 405 may transmit a second egress signal (e.g., to the UE 115-*b* or the base station 105-*c*) that is an amplified version of the second ingress signal over the first bandwidth based on the second mode switch message. For example, prior to transmitting the second egress signal, the repeater 405 may determine that an amplification of the second ingress signal satisfies the amplification threshold and that the UE 115-*b* may successfully receive an amplified version of the second ingress signal (e.g., the second egress signal).

Figure 5:
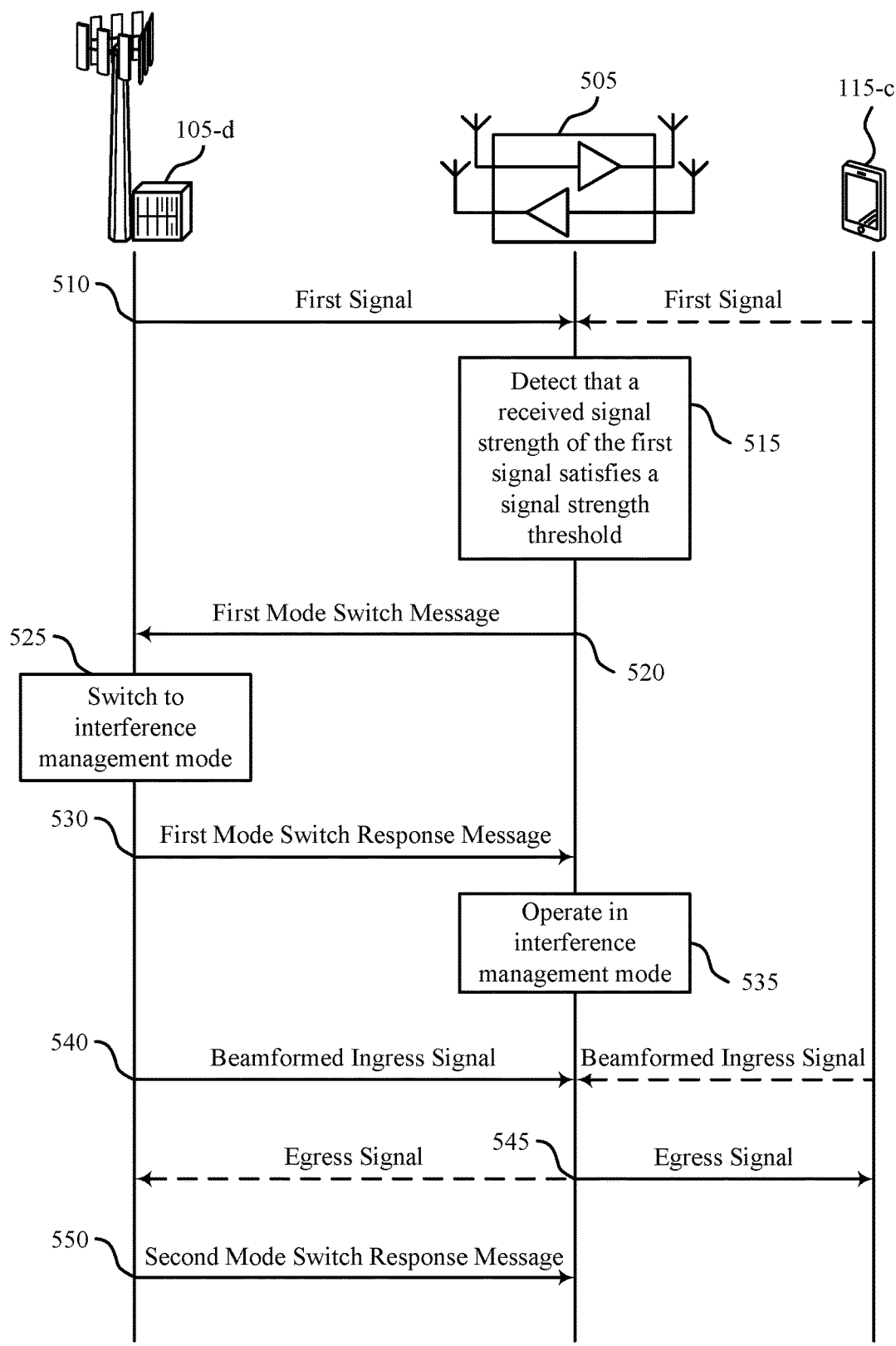

FIG. 5 illustrates an example of a process flow 500 that supports different operating modes (e.g., a coverage expansion operating mode, interference management operating mode, etc.) for a repeater in accordance with aspects of the present disclosure. In some examples, process flow 500 may implement aspects of wireless communications systems 100 and/or 200. Process flow 500 may include a base station 105-*d*, a UE 115-*c*, and a repeater 505, which may be examples of the corresponding communications devices as described herein with reference to FIGS. 1-4. Accordingly, the repeater 505 may be used to forward and amplify messages or signals transmitted between the base station 105-*d* and the UE 115-*c*.

In the following description of the process flow 500, the operations between the base station 105-*d*, the UE 115-*c*, and the repeater 505 may be transmitted in a different order than the exemplary order shown, or the operations performed by the base station 105-*d*, the UE 115-*c*, and the repeater 505 may be performed in different orders or at different times. Some operations may also be left out of the process flow 500, or other operations may be added to the process flow 500. It is to be understood that while the base station 105-*d*, the UE 115-*c*, and the repeater 505 are shown performing a number of the operations of process flow 500, any wireless device may perform the operations shown.

At 510, the repeater may receive a first signal similar to the first signal received at 410 as described herein with reference to FIG. 4.

At 515, however, the repeater 505 may detect that a received signal strength of the first signal satisfies (e.g., exceeds) a signal strength threshold (e.g., RSSI threshold). In some examples, if the repeater 505 detects that the received signal strength satisfies the signal strength threshold, the repeater 505 may determine that the received signal strength at the inputs of the repeater 505 is too high. In some cases, this may suggest that there is a high level of interference at the inputs of the repeater 505. Based on the received signal strength of the first signal exceeding the signal strength threshold, the repeater 505 may determine that the quality (e.g., the SNR, etc.) of the first signal may be adversely affected by the interference at the inputs of the repeater 505 and may determine that a receiver may not successfully receive an amplified version of the first signal. The repeater 505 may determine to request the base station 105-*d* to modify its transmission mode such that subsequent transmissions may be less susceptible to the interference at the inputs of the repeater 505.

At 520, the repeater 505 may transmit a first mode switch message to the base station 105-*d* that indicates a request to switch from a first mode to an interference management mode based on the detection that a received signal strength measurement for the first signal received at 505 satisfies the signal strength threshold. In some examples, the first mode switch message may request the base station to switch to the interference management mode based on detecting high interference at the inputs of the repeater 505. Additionally, the repeater 505 may transmit the first mode switch message as a beacon signal.

At 525, the base station 105-*d* may switch to an interference management mode based on receiving the first mode switch message at 520. In some examples, switching to the interference management mode may include modifying the transmission mode of the base station 105-*d*. For example, the base station 105-*d* may transmit the first signal in a transmission mode that is not using beamforming towards the repeater 505 and may determine to modify its transmission mode to use beamforming towards the repeater 505 based on switching to the interference management mode.

At 530, the base station 105-*d* may transmit a first mode switch response message to the repeater 505 to instruct the repeater 505 to operate in the interference management mode based on the first mode switch message transmitted at 520. In some examples, the instructions may include information about the beamforming (e.g., the transmit beam from the base station 105-*d*, a receive beam (if configured) for the repeater 505 to operate, etc.).

At 535, the repeater 505 may operate in the interference management mode based on the instructions received from the base station 105-*d* at 530.

At 540, the repeater 505 may receive a beamformed ingress signal (e.g., from the base station 105-*d* or the UE 115-*c*). The beamformed ingress signal may be transmitted according to the transmission mode of the interference management mode (e.g., using beamforming). Similarly, the repeater 505 may receive the beamformed ingress signal based on operating in the interference management mode. In some examples, the beamformed ingress signal may be less susceptible to interference than the first signal transmitted at 510. In some examples, the base station 105-*d* or the UE 115-*c* may transmit the beamformed ingress signal so that the repeater 505 may relay an amplified version of the beamformed ingress signal to the UE 115-*c* or the base station 105-*d*, respectively.

At 545, the repeater 505 may transmit, in accordance with the interference management mode, an egress signal that is an amplified version of the beamformed ingress signal received at 540 based on the mode switch message (e.g., to the UE 115-*c* or to the base station 105-*d*). In some examples, the repeater 505 may determine that the beamformed ingress signal was received in a transmission mode that is less susceptible to interference than the transmission mode used to receive the first signal at 510. In such examples, the repeater 505 may determine that the UE 115-*c* may successfully receive the egress signal (e.g., the amplified version of the beamformed ingress signal).

At 550, the base station 105-*d* may transmit a second mode switch response message to the repeater 505 that instructs the repeater 505 to operate in the first mode. For example, the second mode switch response message may instruct the repeater 505 to operate in the transmission mode used prior to the interference management mode (e.g., an initial mode, a default mode, etc. that may have been used to receive the first signal). The base station 105-*d* may terminate the interference management mode at the repeater for a variety of reasons. For example, the base station 105-*d* may terminate the interference management mode based on a determination that the interference at the inputs of the repeater 505 has decreased, the egress signal transmitted to the UE 115-*c* at 545 was successfully received, the base station 105-*d* has other and/or higher priority transmissions, or any other suitable reason.

Figure 6:
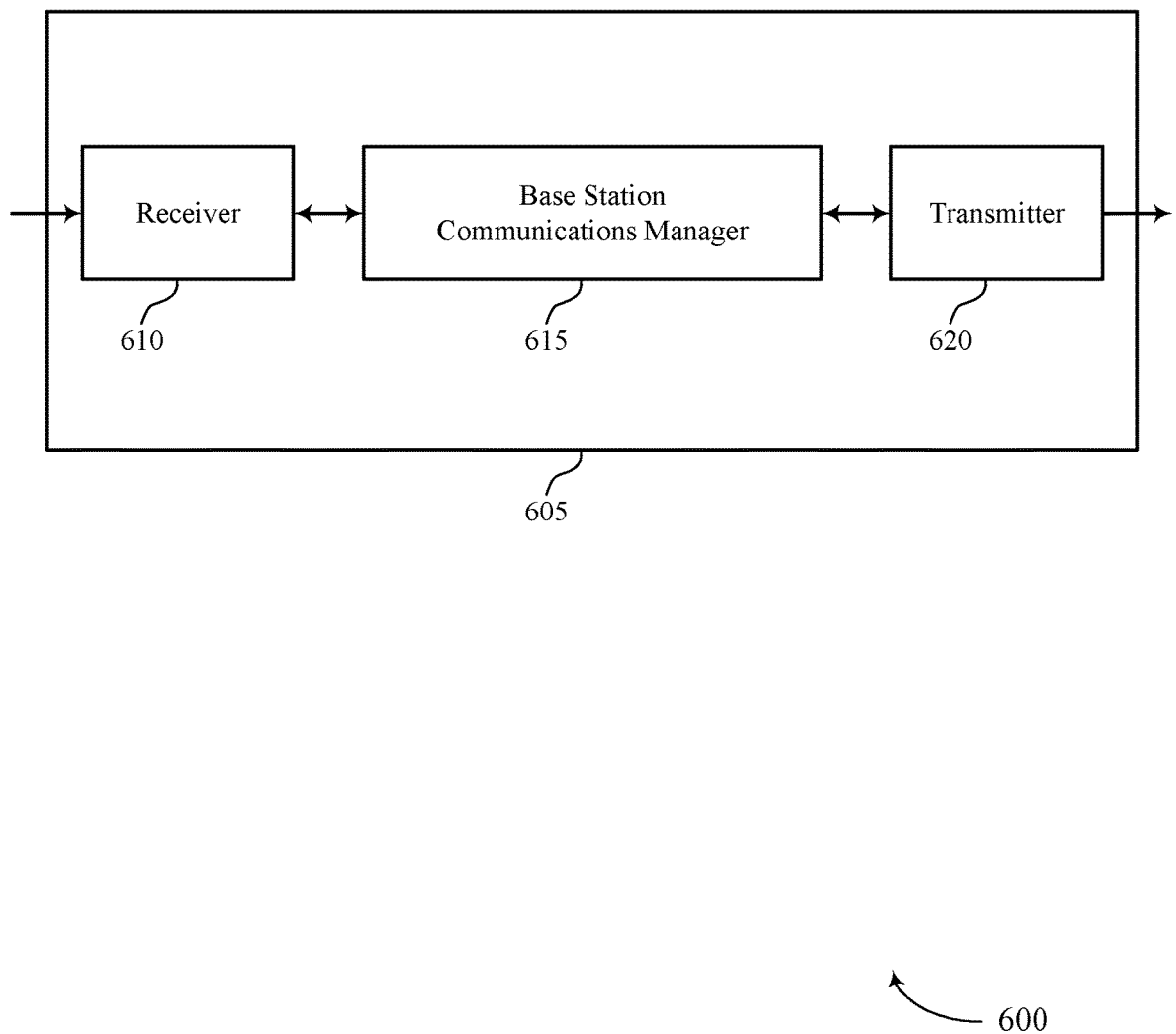
FIGS. 6 and 7 show block diagrams of devices that support different operating modes for a repeater in accordance with aspects of the present disclosure.

FIG. 6 shows a block diagram 600 of a device 605 that supports different operating modes (e.g., a coverage expansion operating mode, interference management operating mode, etc.) for a repeater in accordance with aspects of the present disclosure. The device 605 may be an example of aspects of a base station 105 as described herein. The device 605 may include a receiver 610, a base station communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to coverage expansion and interference operating modes for a repeater, etc.). Information may be passed on to other components of the device 605. The receiver 610 may be an example of aspects of the transceiver 920 described with reference to FIG. 9. The receiver 610 may utilize a single antenna or a set of antennas.

The base station communications manager 615 may receive a mode switch message from a repeater that indicates a request to switch from a first mode to a coverage expansion mode based on detection that amplification of a first signal received over a first bandwidth does not satisfy an amplification threshold. Subsequently, the base station communications manager 615 may transmit, in accordance with the coverage expansion mode, a second signal over a second bandwidth that is narrower than the first bandwidth based on the mode switch message.

Additionally or alternatively, the base station communications manager 615 may receive a mode switch message from a repeater that indicates a request to switch from a first mode to an interference management mode based on detection that a received signal strength measurement for a received first signal satisfies a signal strength threshold. Subsequently, the base station communications manager 615 may transmit, in accordance with the interference management mode, a beamformed signal to the repeater based on the mode switch message. The base station communications manager 615 may be an example of aspects of the base station communications manager 910 described herein.

The base station communications manager 615, or its sub-components, may be implemented in hardware, code (e.g., software or firmware) executed by a processor, or any combination thereof. If implemented in code executed by a processor, the functions of the base station communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The base station communications manager 615, or its sub-components, may be physically located at various positions, including being distributed such that portions of functions are implemented at different physical locations by one or more physical components. In some examples, the base station communications manager 615, or its sub-components, may be a separate and distinct component in accordance with various aspects of the present disclosure. In some examples, the base station communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the base station communications manager 615 as described herein may be implemented to realize one or more potential advantages. One implementation may allow a repeater to more efficiently relay amplified signals to a receiving device based on full network coordination. For example, the repeater may transmit a message to a transmitting device to adjust one or more transmission parameters (e.g., switch into a different transmission mode) such that the repeater may receive signals with a higher received power, a higher SNR, and other improved signal characteristics. The result may be an increase in system efficiency because the repeater may more effectively (e.g., successfully) relay a signal to the receiving device.

Based on more successful relays, the repeater may reduce the number of transmissions of the signal compared to a legacy repeater that does not support full network coordination, and therefore may reduce the interference created by the transmissions of the repeater. Additionally, more successful relays may result in reduced latency in communication between the transmitting device and the receiving device. Further, the repeater may save power and increase battery life based on performing a smaller number of transmissions. Likewise, the transmitting device and/or the receiving device may reduce the time spent transmitting and/or monitoring for the signal, increasing battery life at the transmitting device and the receiving device.

Figure 7:
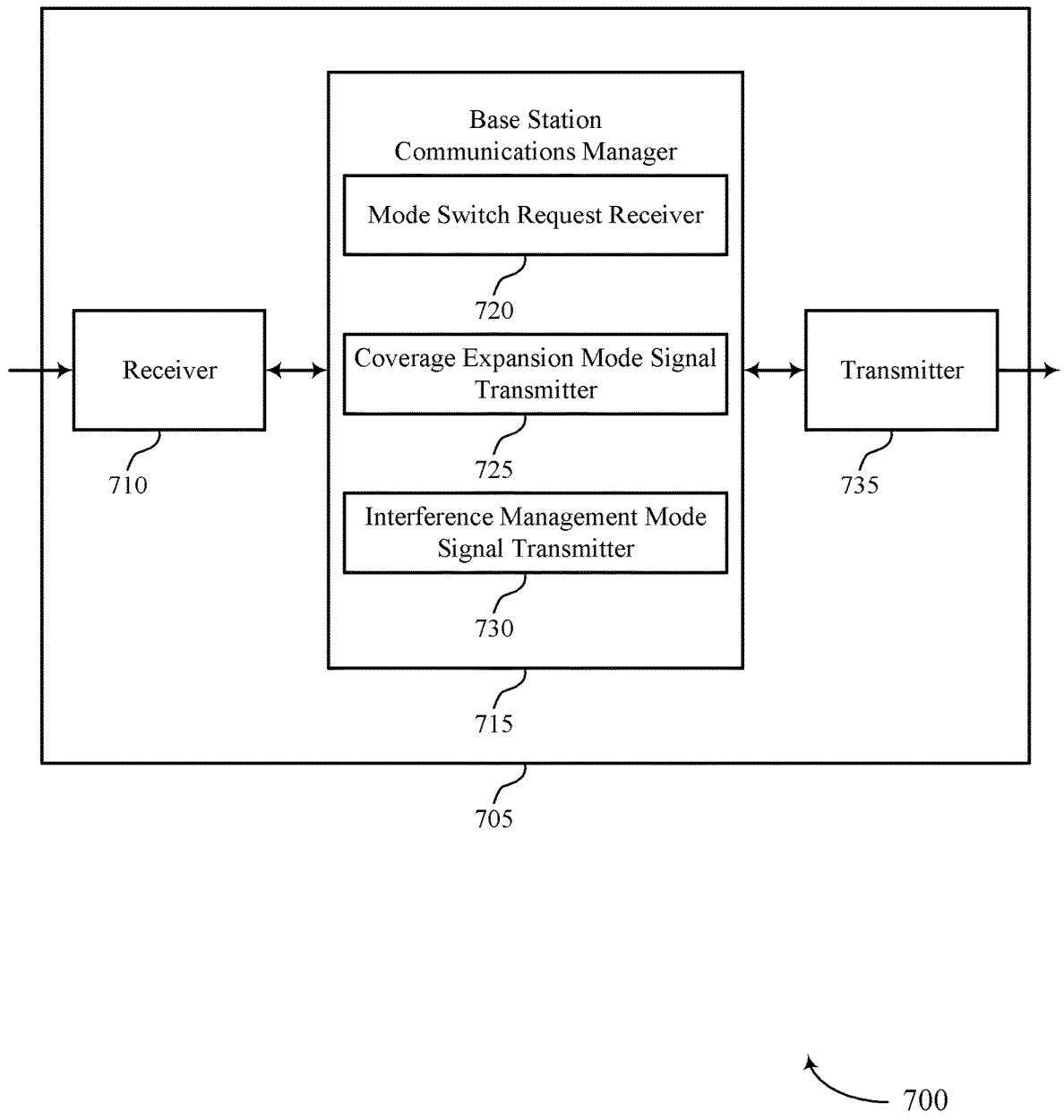

FIG. 7 shows a block diagram 700 of a device 705 that supports different operating modes (e.g., a coverage expansion operating mode, interference management operating mode, etc.) for a repeater in accordance with aspects of the present disclosure. The device 705 may be an example of aspects of a device 605, or a base station 105 as described herein. The device 705 may include a receiver 710, a base station communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to coverage expansion and interference operating modes for a repeater, etc.). Information may be passed on to other components of the device 705. The receiver 710 may be an example of aspects of the transceiver 920 described with reference to FIG. 9. The receiver 710 may utilize a single antenna or a set of antennas.

The base station communications manager 715 may be an example of aspects of the base station communications manager 615 as described herein. The base station communications manager 715 may include a mode switch request receiver 720, a coverage expansion mode signal transmitter 725, and an interference management mode signal transmitter 730. The base station communications manager 715 may be an example of aspects of the base station communications manager 910 described herein.

The mode switch request receiver 720 may receive a mode switch message from a repeater that indicates a request to switch from a first mode to a coverage expansion mode based on detection that amplification of a first signal received over a first bandwidth does not satisfy an amplification threshold. Additionally or alternatively, the mode switch request receiver 720 may receive a mode switch message from a repeater that indicates a request to switch from a first mode to an interference management mode based on detection that a received signal strength measurement for a received first signal satisfies a signal strength threshold.

The coverage expansion mode signal transmitter 725 may transmit, in accordance with the coverage expansion mode, a second signal over a second bandwidth that is narrower than the first bandwidth based on the mode switch message.

The interference management mode signal transmitter 730 may transmit, in accordance with the interference management mode, a beamformed signal to the repeater based on the mode switch message.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
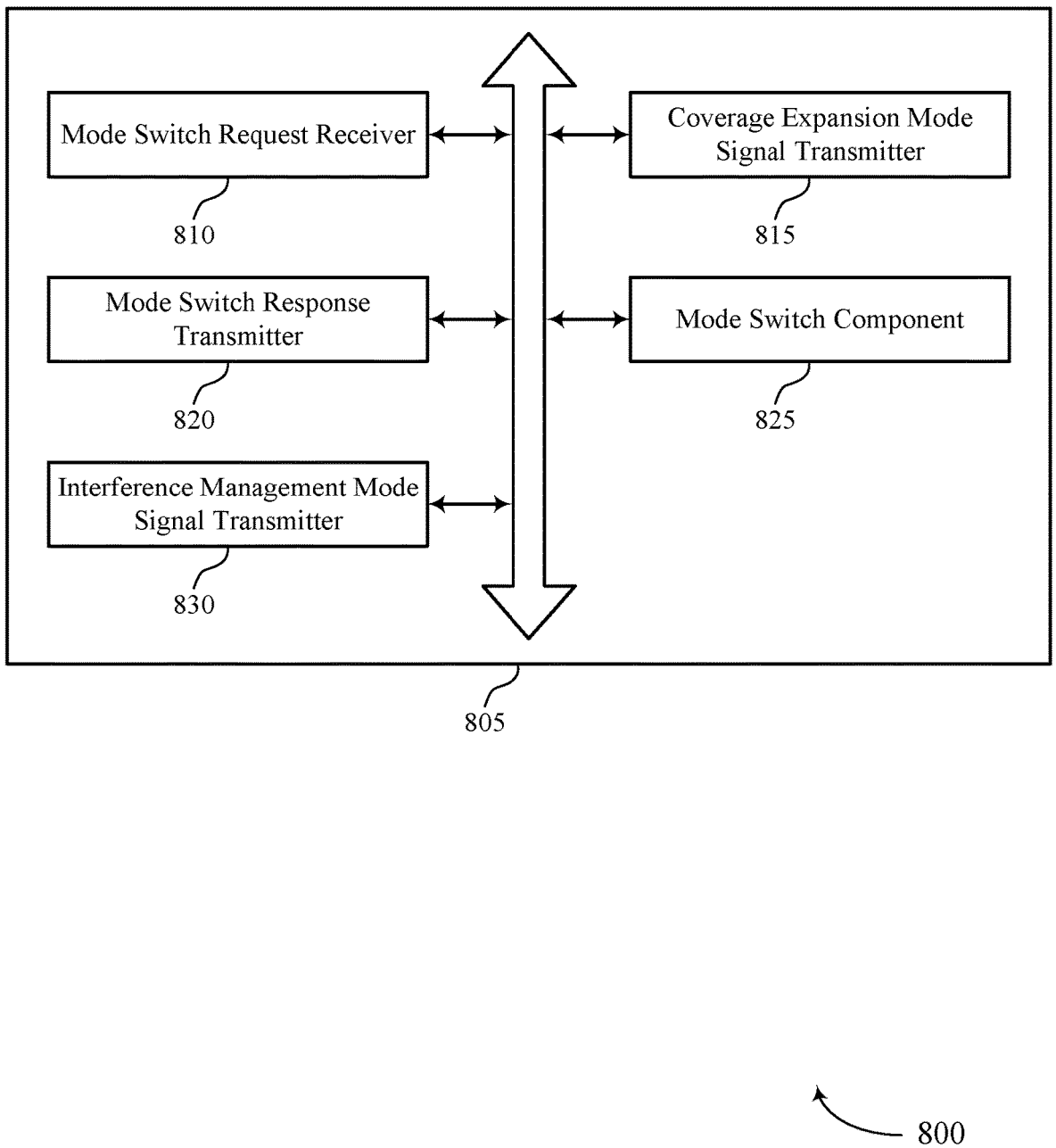
FIG. 8 shows a block diagram of a base station communications manager that supports different operating modes for a repeater in accordance with aspects of the present disclosure.

FIG. 8 shows a block diagram 800 of a base station communications manager 805 that supports different operating modes (e.g., a coverage expansion operating mode, interference management operating mode, etc.) for a repeater in accordance with aspects of the present disclosure. The base station communications manager 805 may be an example of aspects of a base station communications manager 615, a base station communications manager 715, or a base station communications manager 910 described herein. The base station communications manager 805 may include a mode switch request receiver 810, a coverage expansion mode signal transmitter 815, a mode switch response transmitter 820, a mode switch component 825, and an interference management mode signal transmitter 830. Each of these modules may communicate, directly or indirectly, with one another (e.g., via one or more buses).

The mode switch request receiver 810 may receive a mode switch message from a repeater that indicates a request to switch from a first mode to a coverage expansion mode based on detection that amplification of a first signal received over a first bandwidth does not satisfy an amplification threshold. Additionally or alternatively, the mode switch request receiver 810 may receive a mode switch message from a repeater that indicates a request to switch from a first mode to an interference management mode based on detection that a received signal strength measurement for a received first signal satisfies a signal strength threshold. In some examples, the mode switch request receiver 810 may receive the mode switch message as a beacon signal. In some cases, the amplification threshold may be an EIRP threshold. Additionally, the coverage expansion mode may be a frequency selective mode.

The coverage expansion mode signal transmitter 815 may transmit, in accordance with the coverage expansion mode, a second signal over a second bandwidth that is narrower than the first bandwidth based on the mode switch message. In some cases, the second signal may be transmitted via a carrier having the second bandwidth.

The interference management mode signal transmitter 830 may transmit, in accordance with the interference management mode, a beamformed signal to the repeater based on the mode switch message.

The mode switch response transmitter 820 may transmit, to the repeater, a mode switch response message that instructs the repeater to operate in the coverage expansion mode based on the mode switch message. Additionally or alternatively, the mode switch response transmitter 820 may transmit, to the repeater, a mode switch response message that instructs the repeater to operate in the first mode. In some examples, the mode switch response transmitter 820 may transmit, to the repeater, a mode switch response message that instructs the repeater to operate in the inter-ference management mode based on the mode switch message.

The mode switch component 825 may receive a second mode switch message that indicates a request to switch from the coverage expansion mode to the first mode and may transmit a third signal over the first bandwidth based on the second mode switch message. In some examples, the mode switch component 825 may receive the second mode switch message as a beacon signal.

Figure 9:
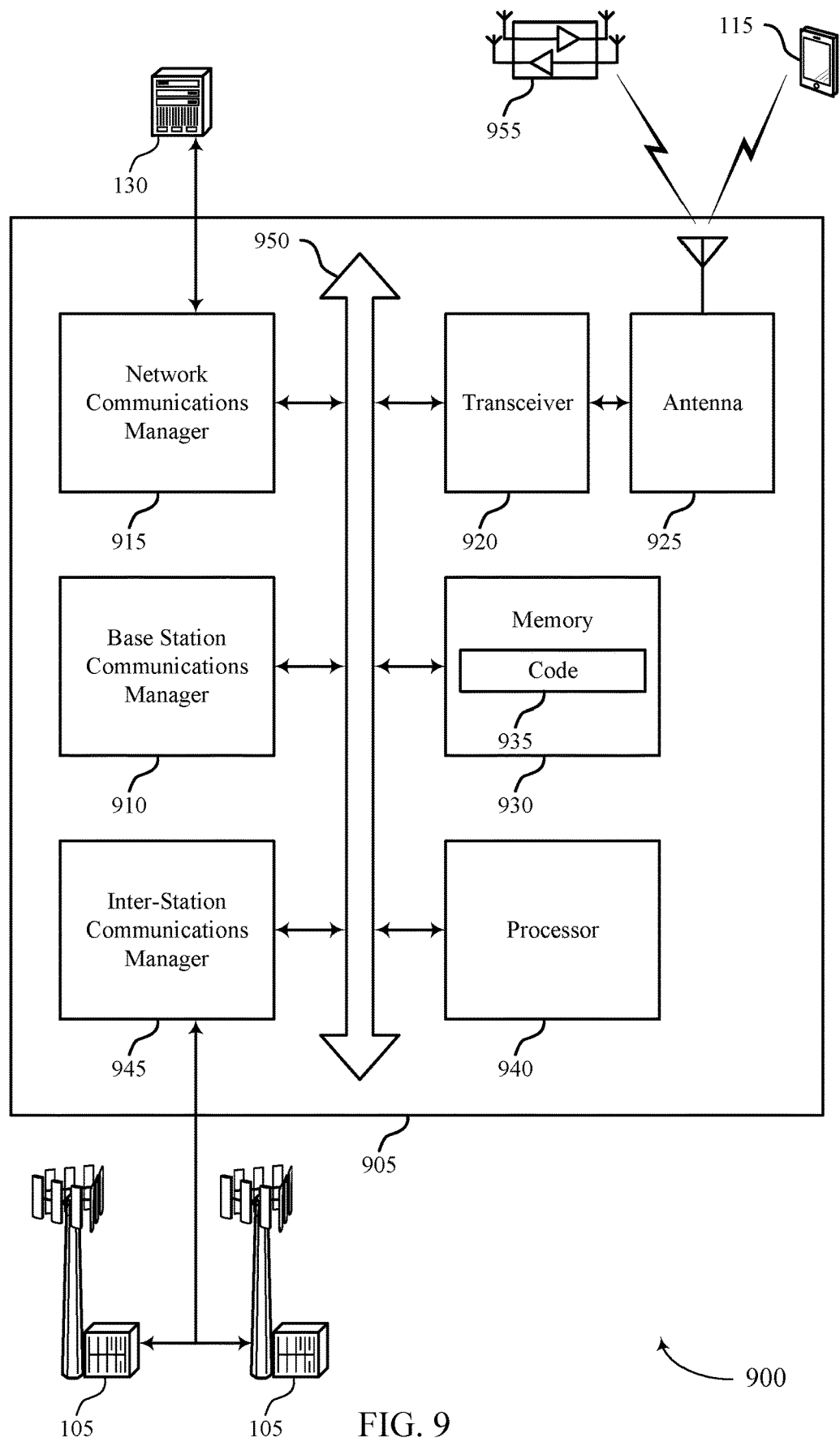
FIG. 9 shows a diagram of a system including a device that supports different operating modes for a repeater in accordance with aspects of the present disclosure.

FIG. 9 shows a diagram of a system 900 including a device 905 that supports different operating modes (e.g., a coverage expansion operating mode, interference management operating mode, etc.) for a repeater in accordance with aspects of the present disclosure. The device 905 may be an example of or include the components of device 605, device 705, or a base station 105 as described herein. The device 905 may include components for bi-directional voice and data communications including components for transmitting and receiving communications, including a base station communications manager 910, a network communications manager 915, a transceiver 920, an antenna 925, memory 930, a processor 940, and an inter-station communications manager 945. These components may be in electronic communication via one or more buses (e.g., bus 950).

The base station communications manager 910 may receive a mode switch message from a repeater that indicates a request to switch from a first mode to a coverage expansion mode based on detection that amplification of a first signal received over a first bandwidth does not satisfy an amplification threshold. Subsequently, the base station communications manager 910 may transmit, in accordance with the coverage expansion mode, a second signal over a second bandwidth that is narrower than the first bandwidth based on the mode switch message.

Additionally or alternatively, the base station communications manager 910 may receive a mode switch message from a repeater that indicates a request to switch from a first mode to an interference management mode based on detection that a received signal strength measurement for a received first signal satisfies a signal strength threshold. Subsequently, the base station communications manager 910 may transmit, in accordance with the interference management mode, a beamformed signal to the repeater based on the mode switch message.

The network communications manager 915 may manage communications with the core network (e.g., via one or more wired backhaul links). For example, the network communications manager 915 may manage the transfer of data communications for client devices, such as one or more UEs 115.

The transceiver 920 may communicate bi-directionally, via one or more antennas, wired, or wireless links as described herein. For example, the transceiver 920 may represent a wireless transceiver and may communicate bi-directionally with another wireless transceiver (e.g., with other base stations 105, one or more UEs 115, a repeater 205 or 305, etc.). The transceiver 920 may also include a modem to modulate the packets and provide the modulated packets to the antennas for transmission, and to demodulate packets received from the antennas.

In some cases, the wireless device may include a single antenna 925. However, in some cases, the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In some cases, a memory controller may be integrated into processor 940. The processor 940 may be configured to execute computer-readable instructions stored in a memory (e.g., the memory 930) to cause the device 905 to perform various functions (e.g., functions or tasks supporting coverage expansion and interference operating modes for a repeater).

The inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
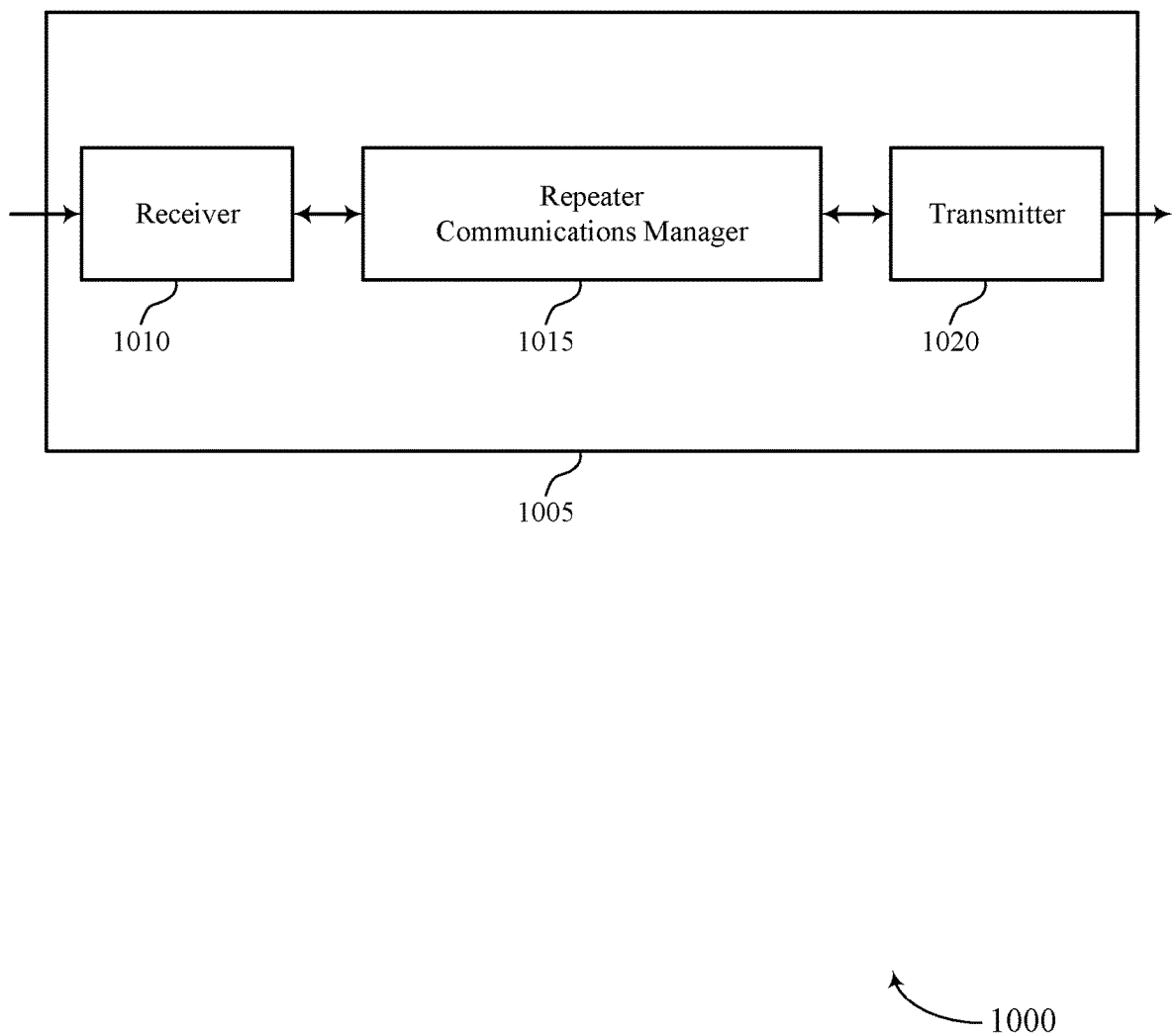
FIGS. 10 and 11 show block diagrams of devices that support different operating modes for a repeater in accordance with aspects of the present disclosure.

FIG. 10 shows a block diagram 1000 of a device 1005 that supports different operating modes (e.g., a coverage expansion operating mode, interference management operating mode, etc.) for a repeater in accordance with aspects of the present disclosure. The device 1005 may be an example of aspects of a repeater (e.g., smart repeater, network device, etc.) as described herein. The device 1005 may include a receiver 1010, a repeater communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to coverage expansion and interference operating modes for a repeater, etc.). Information may be passed on to other components of the device 1005. The receiver 1010 may be an example of aspects of the transceiver 1320 described with reference to FIG. 13. The receiver 1010 may utilize a single antenna or a set of antennas.

The repeater communications manager 1015 may transmit a mode switch message to a base station that indicates a request to switch from a first mode to a coverage expansion mode based on detection that amplification of a first signal received over a first bandwidth does not satisfy an amplification threshold. Subsequently, the repeater communications manager 1015 may transmit, in accordance with the coverage expansion mode, an egress signal that is an amplified version of an ingress signal that is received over a second bandwidth that is narrower than the first bandwidth based on the mode switch message.

Additionally or alternatively, the repeater communications manager 1015 may transmit a mode switch message to a base station that indicates a request to switch from a first mode to an interference management mode based on detection that a received signal strength measurement for a received first signal satisfies a signal strength threshold. Subsequently, the repeater communications manager 1015 may transmit, in accordance with the interference management mode, an egress signal that is an amplified version of a beamformed ingress signal based on the mode switch message. The repeater communications manager 1015 may be an example of aspects of the repeater communications manager 1310 described herein.

The repeater communications manager 1015, or its sub-components, may be implemented in hardware, code (e.g., software or firmware) executed by a processor, or any combination thereof. If implemented in code executed by a processor, the functions of the repeater communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The repeater communications manager 1015, or its sub-components, may be physically located at various positions, including being distributed such that portions of functions are implemented at different physical locations by one or more physical components. In some examples, the repeater communications manager 1015, or its sub-components, may be a separate and distinct component in accordance with various aspects of the present disclosure. In some examples, the repeater communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
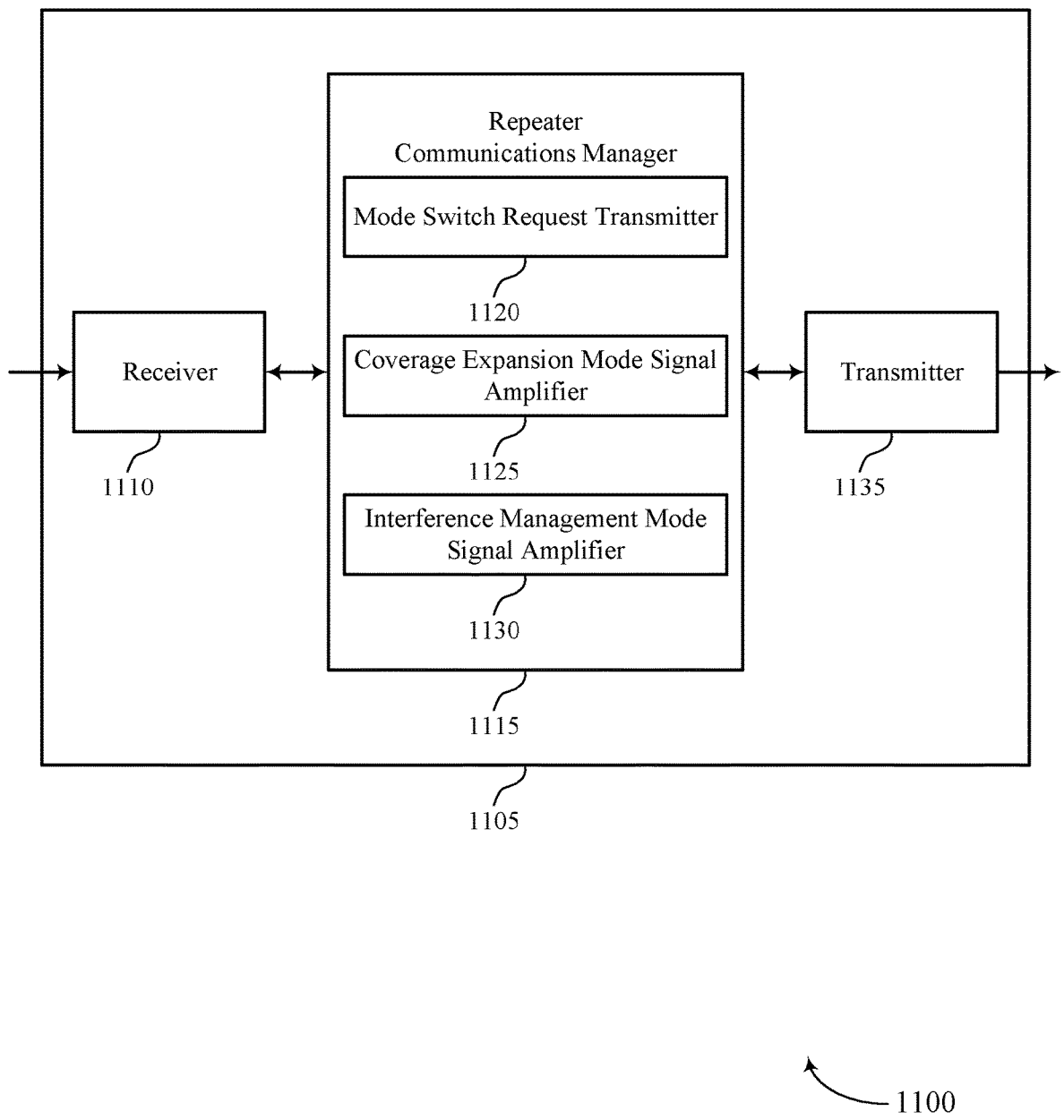

FIG. 11 shows a block diagram 1100 of a device 1105 that supports different operating modes (e.g., a coverage expansion operating mode, interference management operating mode, etc.) for a repeater in accordance with aspects of the present disclosure. The device 1105 may be an example of aspects of a device 1005 or a repeater (e.g., smart repeater, network device, etc.) as described herein. The device 1105 may include a receiver 1110, a repeater communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to coverage expansion and interference operating modes for a repeater, etc.). Information may be passed on to other components of the device 1105. The receiver 1110 may be an example of aspects of the transceiver 1320 described with reference to FIG. 13. The receiver 1110 may utilize a single antenna or a set of antennas.

The repeater communications manager 1115 may be an example of aspects of the repeater communications manager 1015 as described herein. The repeater communications manager 1115 may include a mode switch request transmitter 1120, a coverage expansion mode signal amplifier 1125, and an interference management mode signal amplifier 1130. The repeater communications manager 1115 may be an example of aspects of the repeater communications manager 1310 described herein.

The mode switch request transmitter 1120 may transmit a mode switch message to a base station that indicates a request to switch from a first mode to a coverage expansion mode based on detection that amplification of a first signal received over a first bandwidth does not satisfy an amplification threshold. Additionally or alternatively, the mode switch request transmitter 1120 may transmit a mode switch message to a base station that indicates a request to switch from a first mode to an interference management mode based on detection that a received signal strength measurement for a received first signal satisfies a signal strength threshold.

The coverage expansion mode signal amplifier 1125 may transmit, in accordance with the coverage expansion mode, an egress signal that is an amplified version of an ingress signal that is received over a second bandwidth that is narrower than the first bandwidth based on the mode switch message.

The interference management mode signal amplifier 1130 may transmit, in accordance with the interference management mode, an egress signal that is an amplified version of a beamformed ingress signal based on the mode switch message.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
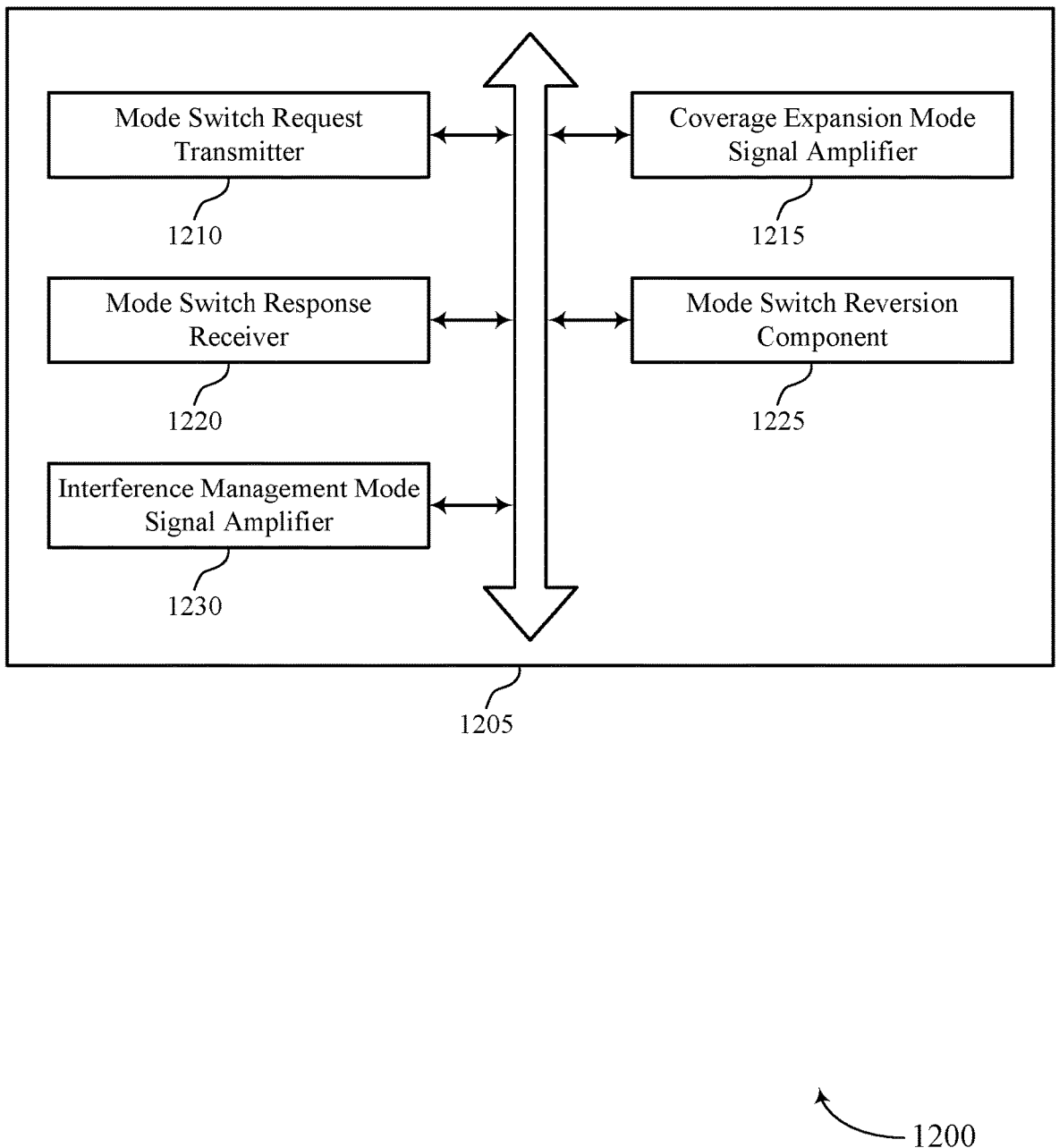
FIG. 12 shows a block diagram of a repeater communications manager that supports different operating modes for a repeater in accordance with aspects of the present disclosure.

FIG. 12 shows a block diagram 1200 of a repeater communications manager 1205 that supports different operating modes (e.g., a coverage expansion operating mode, interference management operating mode, etc.) for a repeater in accordance with aspects of the present disclosure. The repeater communications manager 1205 may be an example of aspects of a repeater communications manager 1015, a repeater communications manager 1115, or a repeater communications manager 1310 described herein. The repeater communications manager 1205 may include a mode switch request transmitter 1210, a coverage expansion mode signal amplifier 1215, a mode switch response receiver 1220, a mode switch reversion component 1225, and an interference management mode signal amplifier 1230. Each of these modules may communicate, directly or indirectly, with one another (e.g., via one or more buses).

The mode switch request transmitter 1210 may transmit a mode switch message to a base station that indicates a request to switch from a first mode to a coverage expansion mode based on detection that amplification of a first signal received over a first bandwidth does not satisfy an amplification threshold. Additionally or alternatively, the mode switch request transmitter 1210 may transmit a mode switch message to a base station that indicates a request to switch from a first mode to an interference management mode based on detection that a received signal strength measurement for a received first signal satisfies a signal strength threshold. In some examples, the mode switch request transmitter 1210 may transmit the mode switch message as a beacon signal. In some cases, the amplification threshold may be an EIRP threshold. In some cases, the coverage expansion mode may be a frequency selective mode.

The coverage expansion mode signal amplifier 1215 may transmit, in accordance with the coverage expansion mode, an egress signal that is an amplified version of an ingress signal that is received over a second bandwidth that is narrower than the first bandwidth based on the mode switch message. In some cases, the ingress signal may be received via a carrier having the second bandwidth.

The interference management mode signal amplifier 1230 may transmit, in accordance with the interference management mode, an egress signal that is an amplified version of a beamformed ingress signal based on the mode switch message.

The mode switch response receiver 1220 may receive, from the base station, a mode switch response message that instructs the repeater to operate in the coverage expansion mode based on the mode switch message. In some examples, the mode switch response receiver 1220 may receive, from the base station, a mode switch response message that instructs the repeater to operate in the first mode. Additionally or alternatively, the mode switch response receiver 1220 may receive, from the base station, a mode switch response message that instructs the repeater to operate in the interference management mode based on the mode switch message. In some examples, the mode switch response receiver 1220 may receive, to the repeater, a mode switch response message that instructs the repeater to operate in the first mode.

The mode switch reversion component 1225 may transmit a second mode switch message to the base station that indicates a request to switch from the coverage expansion mode to the first mode. Accordingly, the mode switch reversion component 1225 may transmit a second egress signal that is an amplified version of a second ingress signal that is received over the first bandwidth based on the second mode switch message. In some examples, the mode switch reversion component 1225 may transmit the second mode switch message as a beacon signal.

Figure 13:
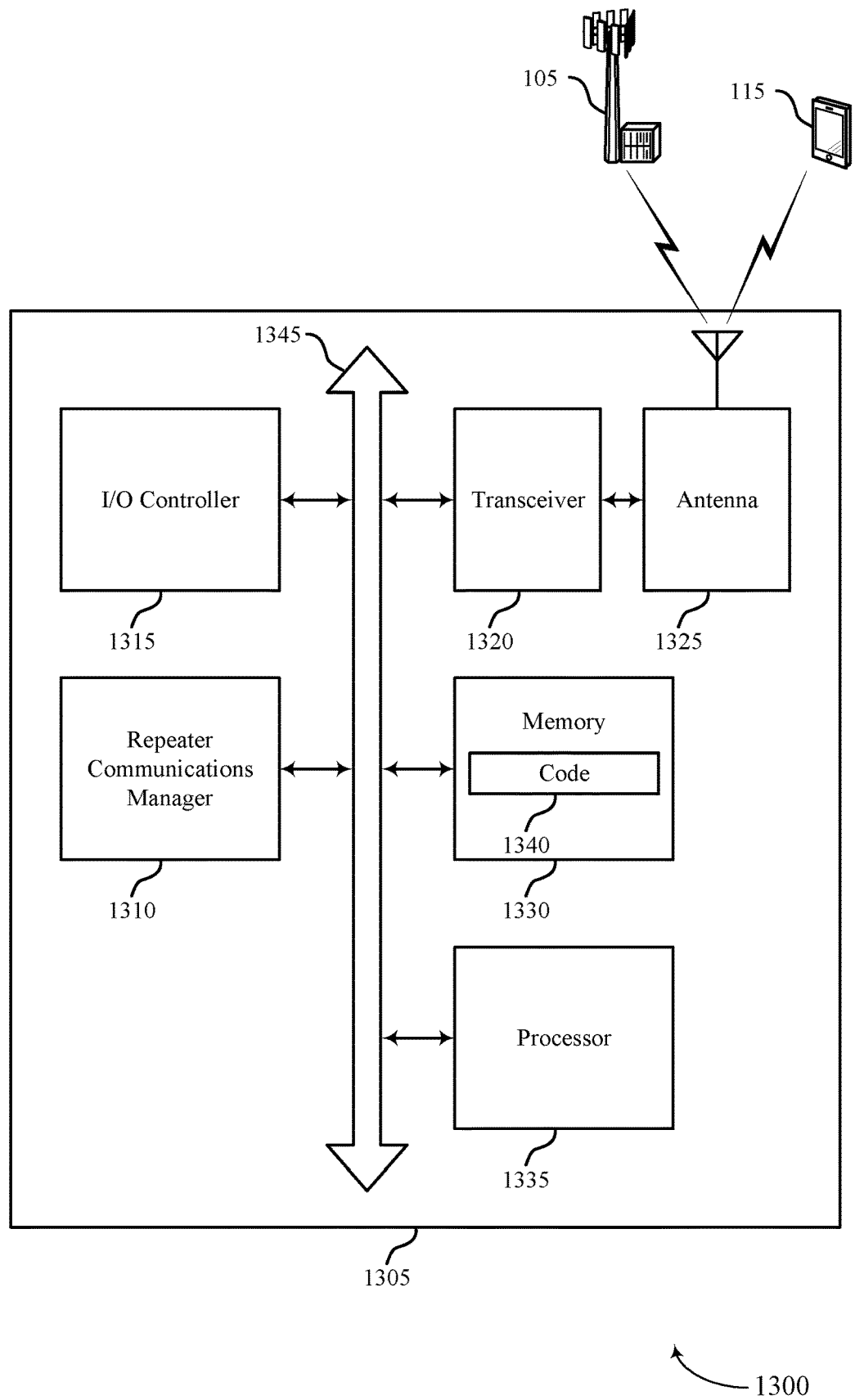
FIG. 13 shows a diagram of a system including a device that supports different operating modes for a repeater in accordance with aspects of the present disclosure.

FIG. 13 shows a diagram of a system 1300 including a device 1305 that supports different operating modes (e.g., a coverage expansion operating mode, interference management operating mode, etc.) for a repeater in accordance with aspects of the present disclosure. The device 1305 may be an example of or include the components of device 1005, device 1105, or a repeater (e.g., smart repeater, network device, etc.) as described herein. The device 1305 may include components for bi-directional voice and data communications including components for transmitting and receiving communications, including a repeater communications manager 1310, an I/O controller 1315, a transceiver 1320, an antenna 1325, memory 1330, and a processor 1335. These components may be in electronic communication via one or more buses (e.g., bus 1345).

The repeater communications manager 1310 may transmit a mode switch message to a base station that indicates a request to switch from a first mode to a coverage expansion mode based on detection that amplification of a first signal received over a first bandwidth does not satisfy an amplification threshold. Subsequently, the repeater communications manager 1310 may transmit, in accordance with the coverage expansion mode, an egress signal that is an amplified version of an ingress signal that is received over a second bandwidth that is narrower than the first bandwidth based on the mode switch message.

Additionally or alternatively, the repeater communications manager 1310 may transmit a mode switch message to a base station that indicates a request to switch from a first mode to an interference management mode based on detection that a received signal strength measurement for a received first signal satisfies a signal strength threshold. Subsequently, the repeater communications manager 1310 may transmit, in accordance with the interference management mode, an egress signal that is an amplified version of a beamformed ingress signal based on the mode switch message.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver (e.g., with a base station 105, a UE 115, or another wireless communications device). The transceiver 1320 may also include a modem to modulate the packets and provide the modulated packets to the antennas for transmission, and to demodulate packets received from the antennas.

In some cases, the wireless device may include a single antenna 1325. However, in some cases, the device may have more than one antenna 1325, which may be capable of concurrently transmitting or receiving multiple wireless transmissions.

The memory 1330 may include RAM and ROM. The memory 1330 may store computer-readable, computer-executable code 1340 including instructions that, when executed, cause the processor to perform various functions described herein. In some cases, the memory 1330 may contain, among other things, a BIOS which may control basic hardware or software operation such as the interaction with peripheral components or devices.

The processor 1335 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1335 may be configured to operate a memory array using a memory controller. In other cases, a memory controller may be integrated into the processor 1335. The processor 1335 may be configured to execute computer-readable instructions stored in a memory (e.g., the memory 1330) to cause the device 1305 to perform various functions (e.g., functions or tasks supporting coverage expansion and interference operating modes for a repeater).

Based on full network coordination of a repeater, the processor 1335 of the repeater may reduce latency of transmissions by more successfully relaying amplified signals to the receiving device. Additionally, the processor 1335 of the repeater may perform a reduced number of computations and/or may lower computation complexities associated with relaying additional signals to the receiving device based on performing a reduced number of transmissions compared to a legacy repeater that does not support full network coordination.

The code 1340 may include instructions to implement aspects of the present disclosure, including instructions to support wireless communications. The code 1340 may be stored in a non-transitory computer-readable medium such as system memory or other type of memory. In some cases, the code 1340 may not be directly executable by the processor 1335 but may cause a computer (e.g., when compiled and executed) to perform functions described herein.

Figure 14:
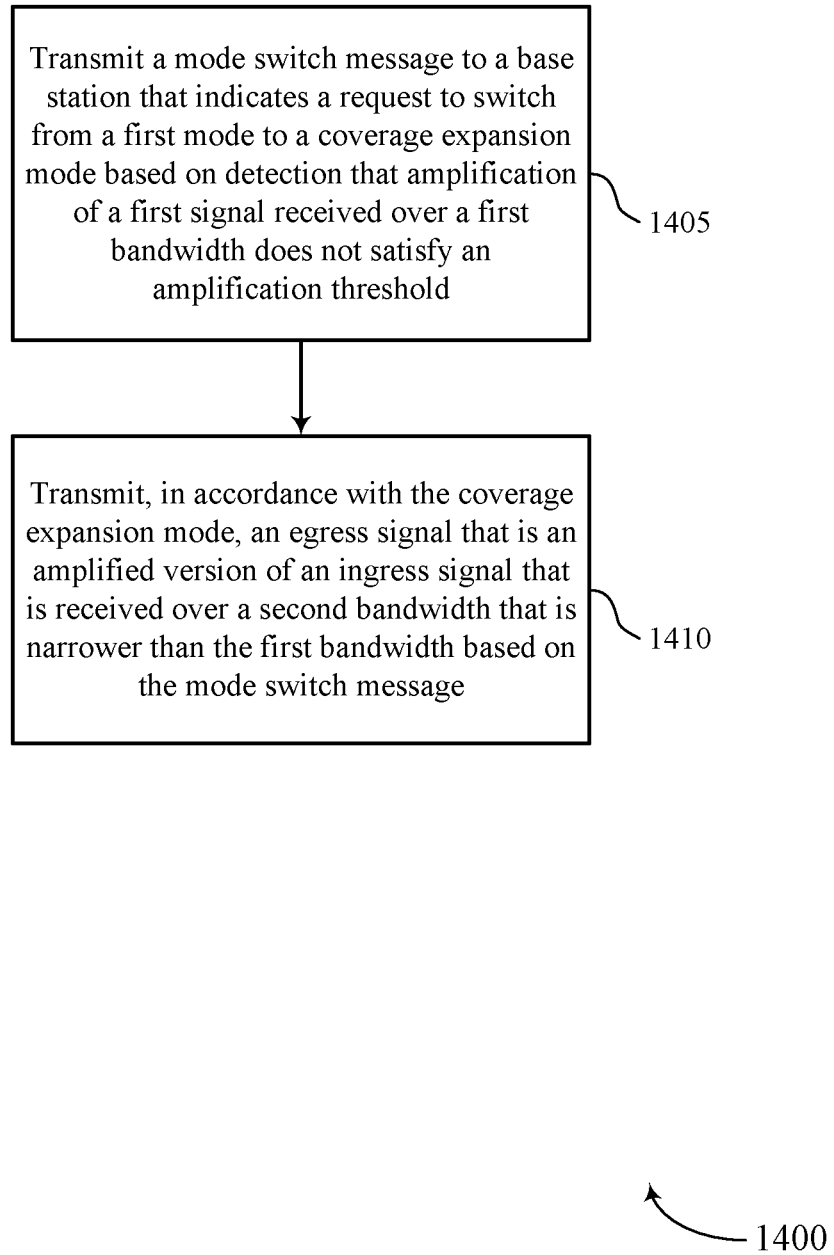
FIGS. 14 through 21 show flowcharts illustrating methods that support different operating modes for a repeater in accordance with aspects of the present disclosure.

FIG. 14 shows a flowchart illustrating a method 1400 that supports different operating modes (e.g., a coverage expansion operating mode, interference management operating mode, etc.) for a repeater in accordance with aspects of the present disclosure. The operations of method 1400 may be implemented by a repeater (e.g., smart repeater, network device, etc.) or its components as described herein. For example, the operations of method 1400 may be performed by a repeater communications manager as described with reference to FIGS. 10 through 13. In some examples, a repeater may execute a set of instructions to control the functional elements of the repeater to perform the functions described herein. Additionally or alternatively, a repeater may perform aspects of the functions described herein using special-purpose hardware.

At 1405, the repeater may transmit a mode switch message to a base station that indicates a request to switch from a first mode to a coverage expansion mode based on detection that amplification of a first signal received over a first bandwidth does not satisfy an amplification threshold. The operations of 1405 may be performed according to the methods described herein. In some examples, aspects of the operations of 1405 may be performed by a mode switch request transmitter as described with reference to FIGS. 10 through 13. Additionally or alternatively, means for performing 1405 may, but not necessarily, include, for example, antenna 1325, transceiver 1320, repeater communications manager 1310, memory 1330 (including code 1340), processor 1335 and/or bus 1345.

At 1410, the repeater may transmit, in accordance with the coverage expansion mode, an egress signal that is an amplified version of an ingress signal that is received over a second bandwidth that is narrower than the first bandwidth based on the mode switch message. The operations of 1410 may be performed according to the methods described herein. In some examples, aspects of the operations of 1410 may be performed by a coverage expansion mode signal amplifier as described with reference to FIGS. 10 through 13. Additionally or alternatively, means for performing 1410 may, but not necessarily, include, for example, antenna 1325, transceiver 1320, repeater communications manager 1310, memory 1330 (including code 1340), processor 1335 and/or bus 1345.

Figure 15:
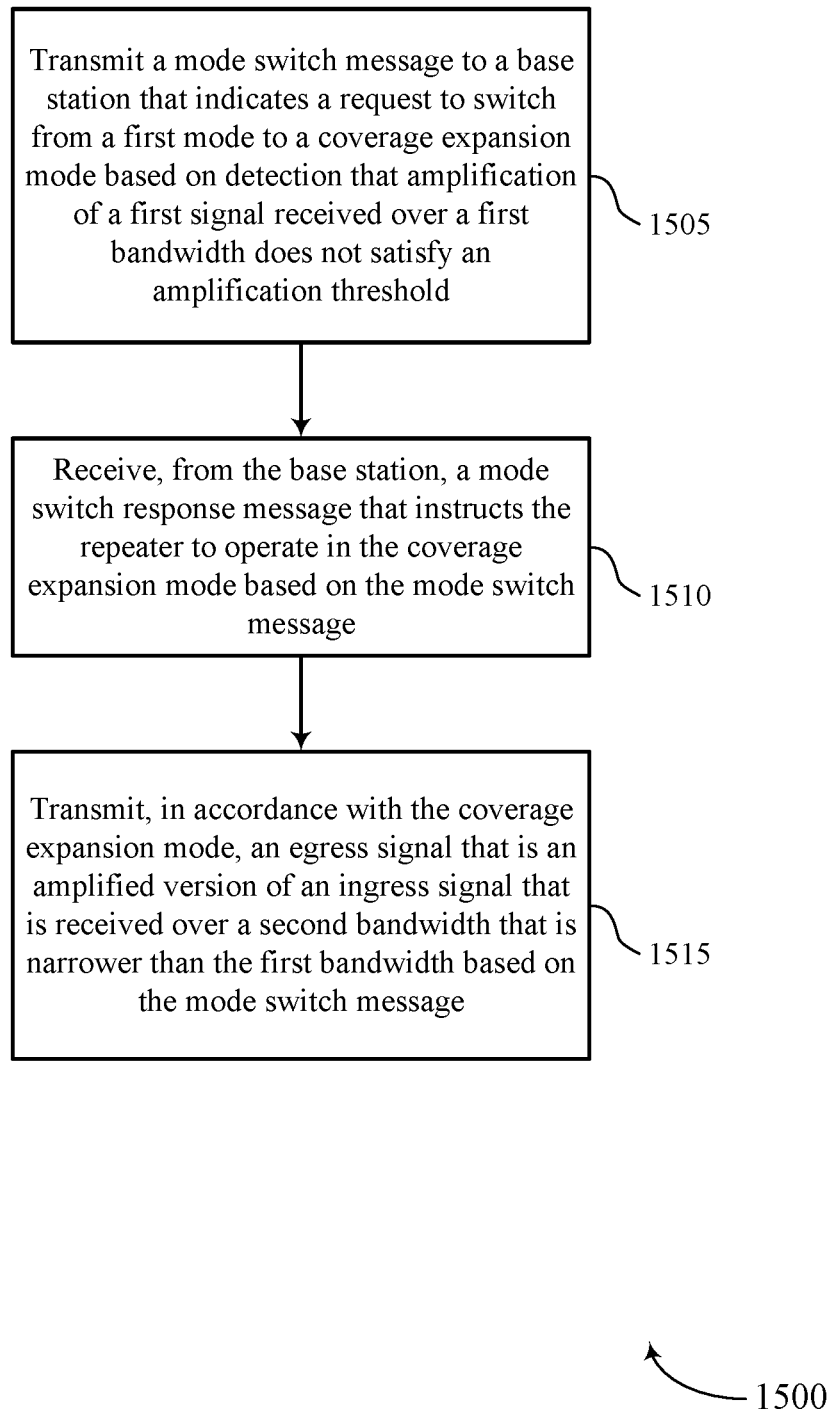

FIG. 15 shows a flowchart illustrating a method 1500 that supports different operating modes (e.g., a coverage expansion operating mode, interference management operating mode, etc.) for a repeater in accordance with aspects of the present disclosure. The operations of method 1500 may be implemented by a repeater (e.g., smart repeater, network device, etc.) or its components as described herein. For example, the operations of method 1500 may be performed by a repeater communications manager as described with reference to FIGS. 10 through 13. In some examples, a repeater may execute a set of instructions to control the functional elements of the repeater to perform the functions described herein. Additionally or alternatively, a repeater may perform aspects of the functions described herein using special-purpose hardware.

At 1505, the repeater may transmit a mode switch message to a base station that indicates a request to switch from a first mode to a coverage expansion mode based on detection that amplification of a first signal received over a first bandwidth does not satisfy an amplification threshold. The operations of 1505 may be performed according to the methods described herein. In some examples, aspects of the operations of 1505 may be performed by a mode switch request transmitter as described with reference to FIGS. 10 through 13. Additionally or alternatively, means for performing 1505 may, but not necessarily, include, for example, antenna 1325, transceiver 1320, repeater communications manager 1310, memory 1330 (including code 1340), processor 1335 and/or bus 1345.

At 1510, the repeater may receive, from the base station, a mode switch response message that instructs the repeater to operate in the coverage expansion mode based on the mode switch message. The operations of 1510 may be performed according to the methods described herein. In some examples, aspects of the operations of 1510 may be performed by a mode switch response receiver as described with reference to FIGS. 10 through 13. Additionally or alternatively, means for performing 1510 may, but not necessarily, include, for example, antenna 1325, transceiver 1320, repeater communications manager 1310, memory 1330 (including code 1340), processor 1335 and/or bus 1345.

At 1515, the repeater may transmit, in accordance with the coverage expansion mode, an egress signal that is an amplified version of an ingress signal that is received over a second bandwidth that is narrower than the first bandwidth based on the mode switch message. The operations of 1515 may be performed according to the methods described herein. In some examples, aspects of the operations of 1515 may be performed by a coverage expansion mode signal amplifier as described with reference to FIGS. 10 through 13. Additionally or alternatively, means for performing 1515 may, but not necessarily, include, for example, antenna 1325, transceiver 1320, repeater communications manager 1310, memory 1330 (including code 1340), processor 1335 and/or bus 1345.

Figure 16:
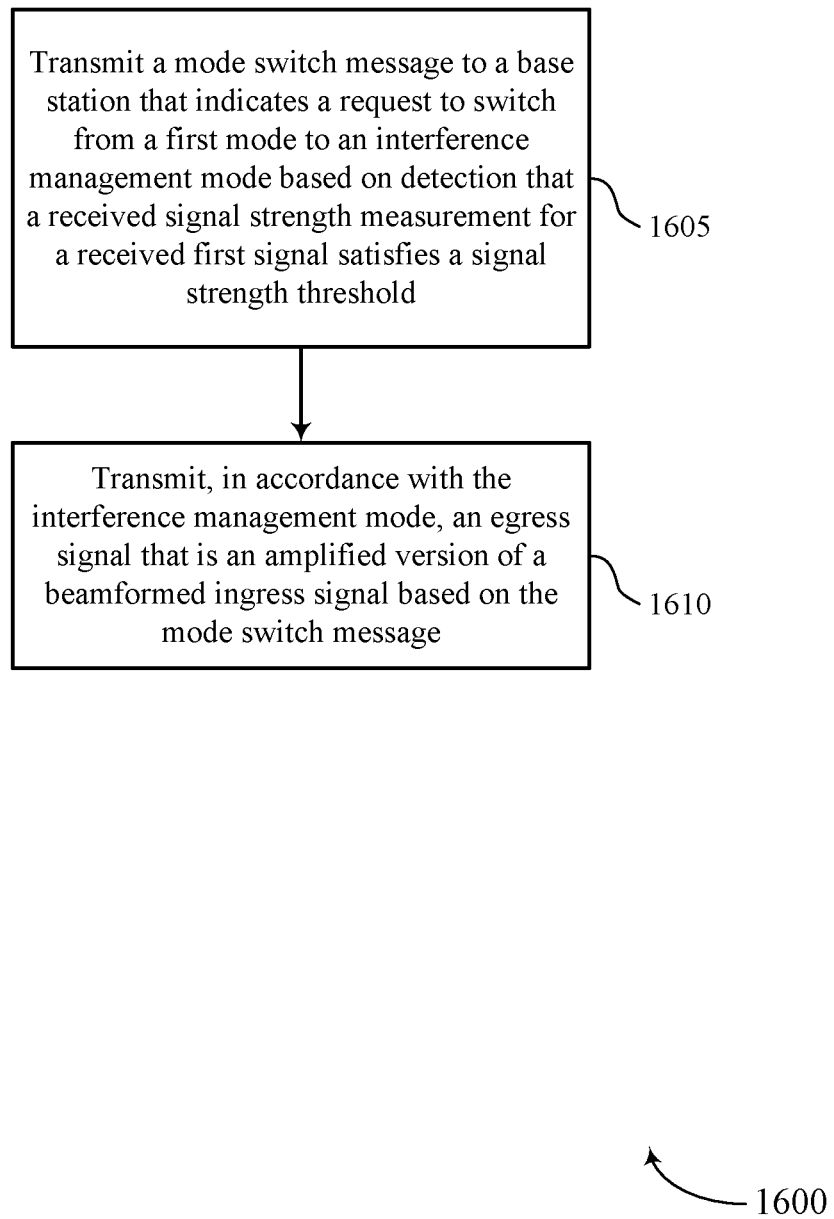

FIG. 16 shows a flowchart illustrating a method 1600 that supports different operating modes (e.g., a coverage expansion operating mode, interference management operating mode, etc.) for a repeater in accordance with aspects of the present disclosure. The operations of method 1600 may be implemented by a repeater (e.g., smart repeater, network device, etc.) or its components as described herein. For example, the operations of method 1600 may be performed by a repeater communications manager as described with reference to FIGS. 10 through 13. In some examples, a repeater may execute a set of instructions to control the functional elements of the repeater to perform the functions described herein. Additionally or alternatively, a repeater may perform aspects of the functions described herein using special-purpose hardware.

At 1605, the repeater may transmit a mode switch message to a base station that indicates a request to switch from a first mode to an interference management mode based on detection that a received signal strength measurement for a received first signal satisfies a signal strength threshold. The operations of 1605 may be performed according to the methods described herein. In some examples, aspects of the operations of 1605 may be performed by a mode switch request transmitter as described with reference to FIGS. 10 through 13. Additionally or alternatively, means for performing 1605 may, but not necessarily, include, for example, antenna 1325, transceiver 1320, repeater communications manager 1310, memory 1330 (including code 1340), processor 1335 and/or bus 1345.

At 1610, the repeater may transmit, in accordance with the interference management mode, an egress signal that is an amplified version of a beamformed ingress signal based on the mode switch message. The operations of 1610 may be performed according to the methods described herein. In some examples, aspects of the operations of 1610 may be performed by an interference management mode signal amplifier as described with reference to FIGS. 10 through 13. Additionally or alternatively, means for performing 1610 may, but not necessarily, include, for example, antenna 1325, transceiver 1320, repeater communications manager 1310, memory 1330 (including code 1340), processor 1335 and/or bus 1345.

Figure 17:
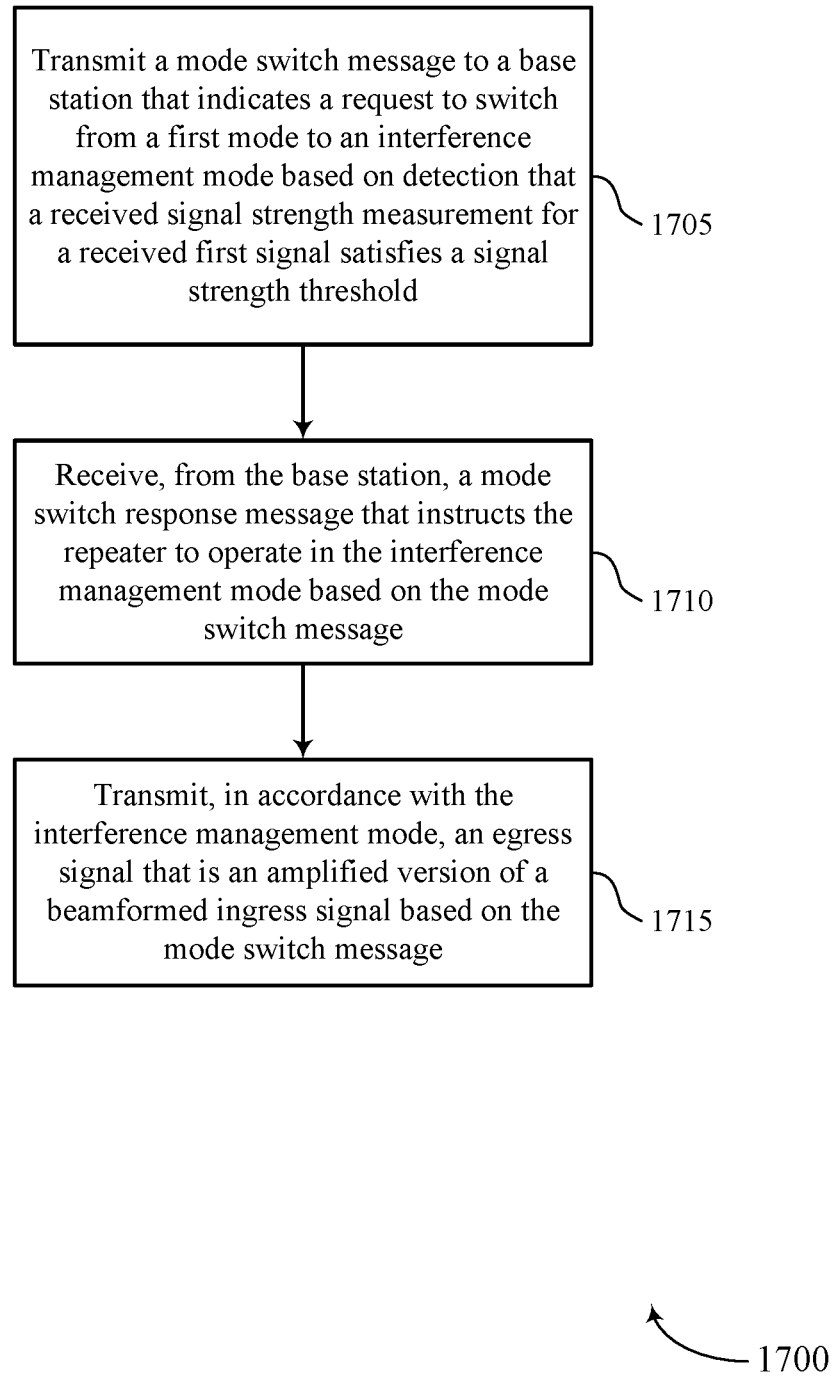

FIG. 17 shows a flowchart illustrating a method 1700 that supports different operating modes (e.g., a coverage expansion operating mode, interference management operating mode, etc.) for a repeater in accordance with aspects of the present disclosure. The operations of method 1700 may be implemented by a repeater (e.g., smart repeater, network device, etc.) or its components as described herein. For example, the operations of method 1700 may be performed by a repeater communications manager as described with reference to FIGS. 10 through 13. In some examples, a repeater may execute a set of instructions to control the functional elements of the repeater to perform the functions described herein. Additionally or alternatively, a repeater may perform aspects of the functions described herein using special-purpose hardware.

At 1705, the repeater may transmit a mode switch message to a base station that indicates a request to switch from a first mode to an interference management mode based on detection that a received signal strength measurement for a received first signal satisfies a signal strength threshold. The operations of 1705 may be performed according to the methods described herein. In some examples, aspects of the operations of 1705 may be performed by a mode switch request transmitter as described with reference to FIGS. 10 through 13. Additionally or alternatively, means for performing 1705 may, but not necessarily, include, for example, antenna 1325, transceiver 1320, repeater communications manager 1310, memory 1330 (including code 1340), processor 1335 and/or bus 1345.

At 1710, the repeater may receive, from the base station, a mode switch response message that instructs the repeater to operate in the interference management mode based on the mode switch message. The operations of 1710 may be performed according to the methods described herein. In some examples, aspects of the operations of 1710 may be performed by a mode switch response receiver as described with reference to FIGS. 10 through 13. Additionally or alternatively, means for performing 1710 may, but not necessarily, include, for example, antenna 1325, transceiver 1320, repeater communications manager 1310, memory 1330 (including code 1340), processor 1335 and/or bus 1345.

At 1715, the repeater may transmit, in accordance with the interference management mode, an egress signal that is an amplified version of a beamformed ingress signal based on the mode switch message. The operations of 1715 may be performed according to the methods described herein. In some examples, aspects of the operations of 1715 may be performed by an interference management mode signal amplifier as described with reference to FIGS. 10 through 13. Additionally or alternatively, means for performing 1715 may, but not necessarily, include, for example, antenna 1325, transceiver 1320, repeater communications manager 1310, memory 1330 (including code 1340), processor 1335 and/or bus 1345.

Figure 18:
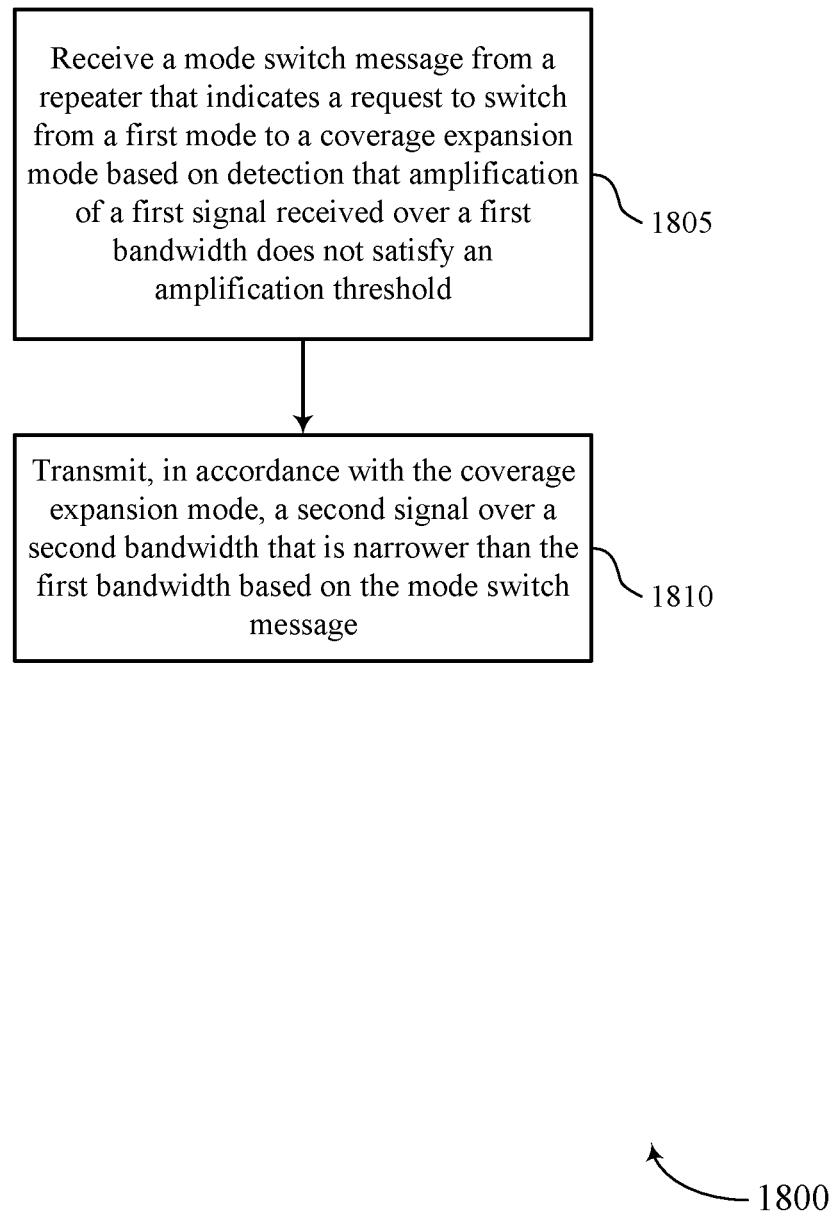

FIG. 18 shows a flowchart illustrating a method 1800 that supports different operating modes (e.g., a coverage expansion operating mode, interference management operating mode, etc.) for a repeater in accordance with aspects of the present disclosure. The operations of method 1800 may be implemented by a base station 105 or its components as described herein. For example, the operations of method 1800 may be performed by a base station communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1805, the base station may receive a mode switch message from a repeater that indicates a request to switch from a first mode to a coverage expansion mode based on detection that amplification of a first signal received over a first bandwidth does not satisfy an amplification threshold. The operations of 1805 may be performed according to the methods described herein. In some examples, aspects of the operations of 1805 may be performed by a mode switch request receiver as described with reference to FIGS. 6 through 9. Additionally or alternatively, means for performing 1805 may, but not necessarily, include, for example, antenna 925, transceiver 920, base station communications manager 910, memory 930 (including code 935), processor 940 and/or bus 950.

At 1810, the base station may transmit, in accordance with the coverage expansion mode, a second signal over a second bandwidth that is narrower than the first bandwidth based on the mode switch message. The operations of 1810 may be performed according to the methods described herein. In some examples, aspects of the operations of 1810 may be performed by a coverage expansion mode signal transmitter as described with reference to FIGS. 6 through 9. Additionally or alternatively, means for performing 1810 may, but not necessarily, include, for example, antenna 925, transceiver 920, base station communications manager 910, memory 930 (including code 935), processor 940 and/or bus 950.

Figure 19:
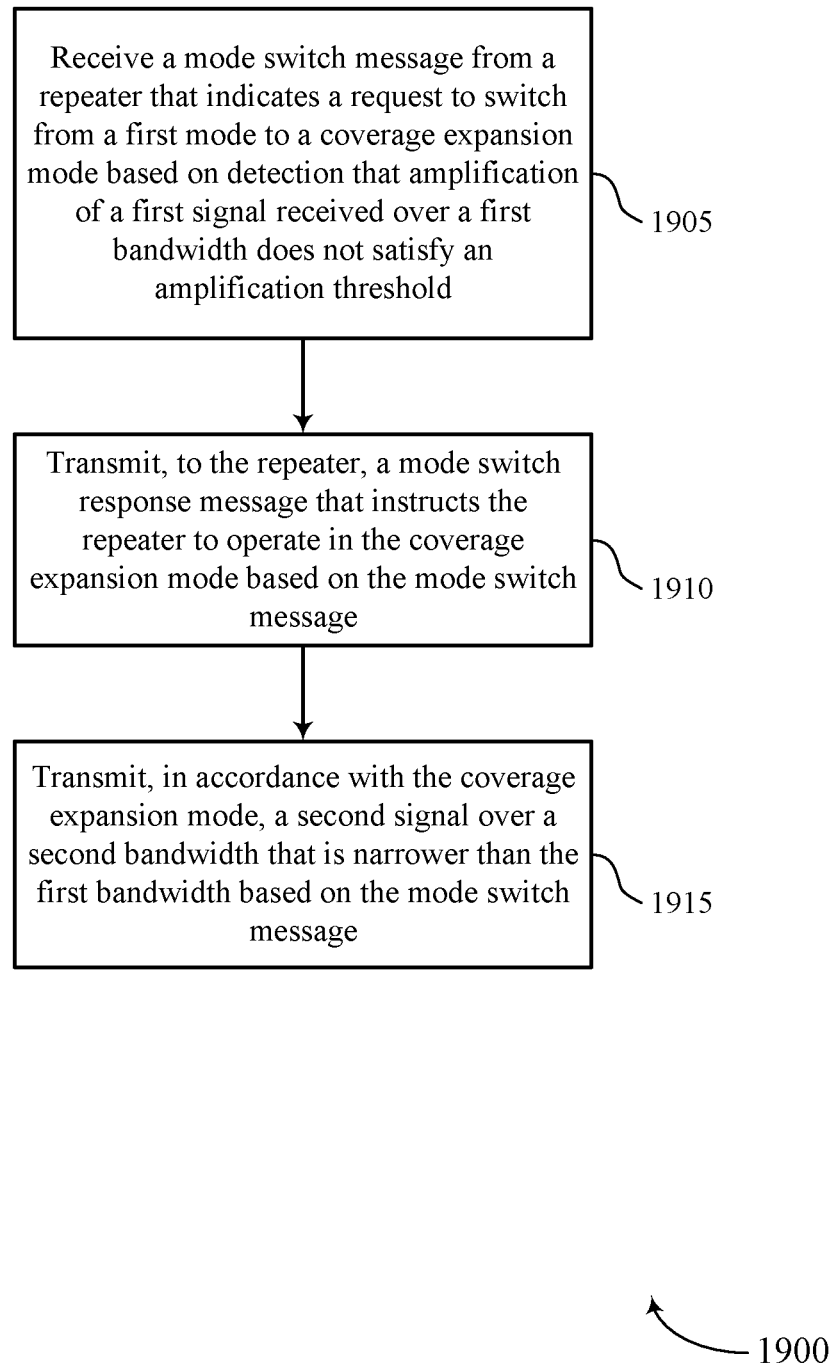

FIG. 19 shows a flowchart illustrating a method 1900 that supports different operating modes (e.g., a coverage expansion operating mode, interference management operating mode, etc.) for a repeater in accordance with aspects of the present disclosure. The operations of method 1900 may be implemented by a base station 105 or its components as described herein. For example, the operations of method 1900 may be performed by a base station communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1905, the base station may receive a mode switch message from a repeater that indicates a request to switch from a first mode to a coverage expansion mode based on detection that amplification of a first signal received over a first bandwidth does not satisfy an amplification threshold. The operations of 1905 may be performed according to the methods described herein. In some examples, aspects of the operations of 1905 may be performed by a mode switch request receiver as described with reference to FIGS. 6 through 9. Additionally or alternatively, means for performing 1905 may, but not necessarily, include, for example, antenna 925, transceiver 920, base station communications manager 910, memory 930 (including code 935), processor 940 and/or bus 950.

At 1910, the base station may transmit, to the repeater, a mode switch response message that instructs the repeater to operate in the coverage expansion mode based on the mode switch message. The operations of 1910 may be performed according to the methods described herein. In some examples, aspects of the operations of 1910 may be performed by a mode switch response transmitter as described with reference to FIGS. 6 through 9. Additionally or alternatively, means for performing 1910 may, but not necessarily, include, for example, antenna 925, transceiver 920, base station communications manager 910, memory 930 (including code 935), processor 940 and/or bus 950.

At 1915, the base station may transmit, in accordance with the coverage expansion mode, a second signal over a second bandwidth that is narrower than the first bandwidth based on the mode switch message. The operations of 1915 may be performed according to the methods described herein. In some examples, aspects of the operations of 1915 may be performed by a coverage expansion mode signal transmitter as described with reference to FIGS. 6 through 9. Additionally or alternatively, means for performing 1915 may, but not necessarily, include, for example, antenna 925, transceiver 920, base station communications manager 910, memory 930 (including code 935), processor 940 and/or bus 950.

Figure 20:
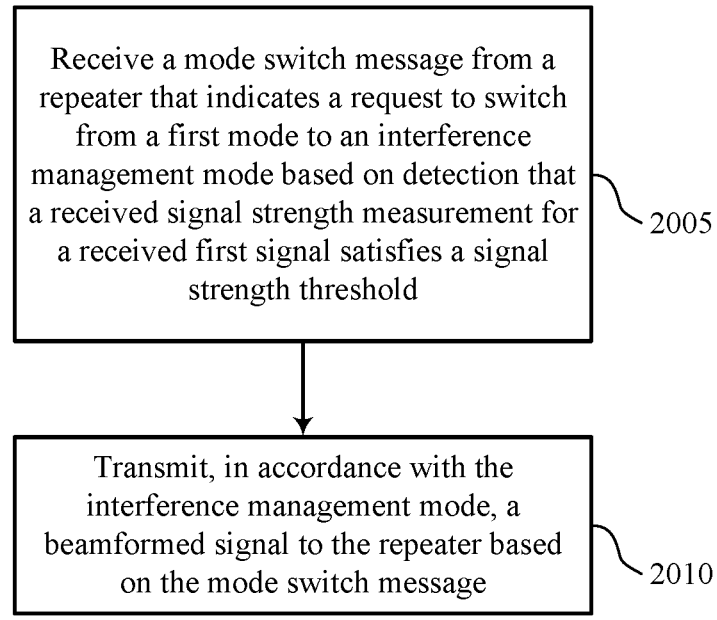

FIG. 20 shows a flowchart illustrating a method 2000 that supports different operating modes (e.g., a coverage expansion operating mode, interference management operating mode, etc.) for a repeater in accordance with aspects of the present disclosure. The operations of method 2000 may be implemented by a base station 105 or its components as described herein. For example, the operations of method 2000 may be performed by a base station communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 2005, the base station may receive a mode switch message from a repeater that indicates a request to switch from a first mode to an interference management mode based on detection that a received signal strength measurement for a received first signal satisfies a signal strength threshold. The operations of 2005 may be performed according to the methods described herein. In some examples, aspects of the operations of 2005 may be performed by a mode switch request receiver as described with reference to FIGS. 6 through 9. Additionally or alternatively, means for performing 2005 may, but not necessarily, include, for example, antenna 925, transceiver 920, base station communications manager 910, memory 930 (including code 935), processor 940 and/or bus 950.

At 2010, the base station may transmit, in accordance with the interference management mode, a beamformed signal to the repeater based on the mode switch message. The operations of 2010 may be performed according to the methods described herein. In some examples, aspects of the operations of 2010 may be performed by an interference management mode signal transmitter as described with reference to FIGS. 6 through 9. Additionally or alternatively, means for performing 2010 may, but not necessarily, include, for example, antenna 925, transceiver 920, base station communications manager 910, memory 930 (including code 935), processor 940 and/or bus 950.

Figure 21:
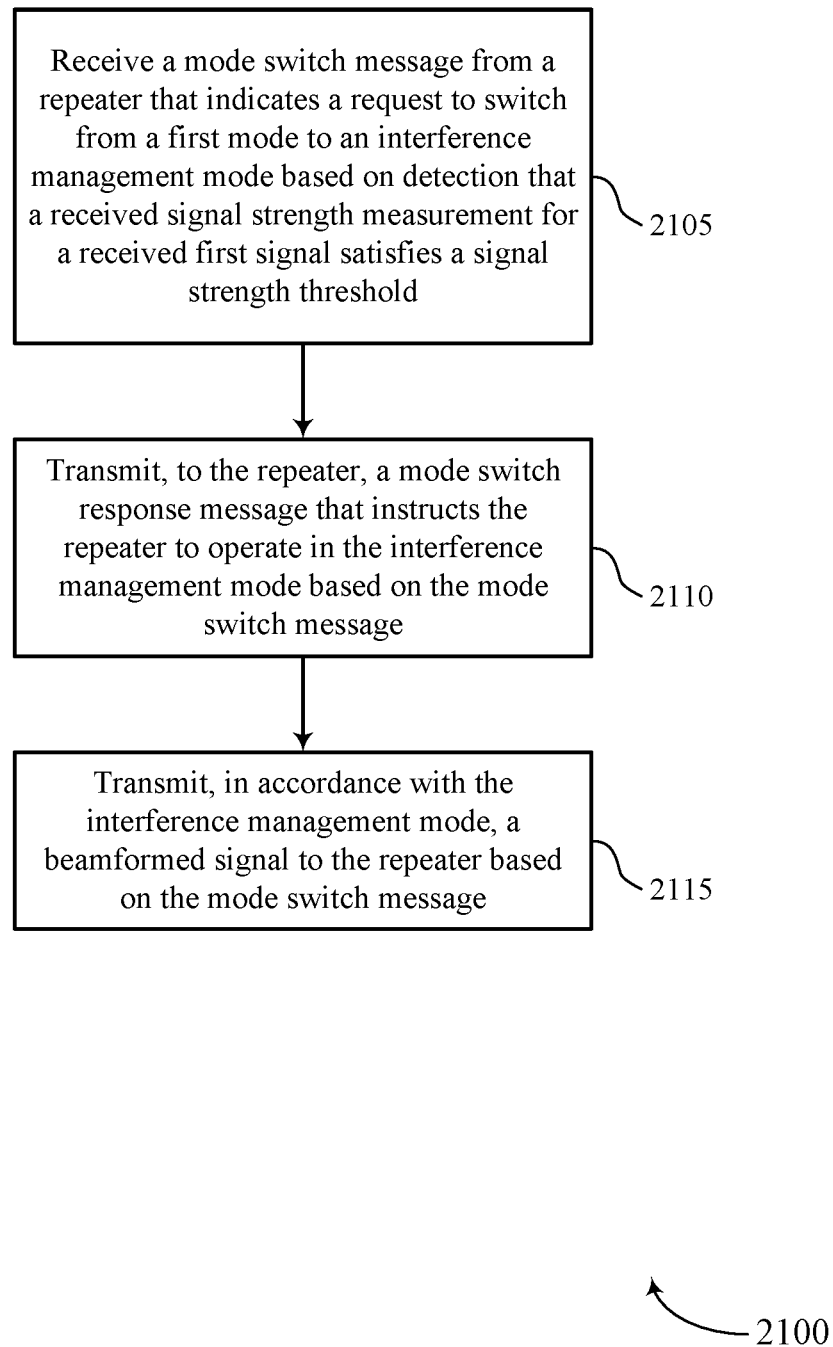

FIG. 21 shows a flowchart illustrating a method 2100 that supports different operating modes (e.g., a coverage expansion operating mode, interference management operating mode, etc.) for a repeater in accordance with aspects of the present disclosure. The operations of method 2100 may be implemented by a base station 105 or its components as described herein. For example, the operations of method 2100 may be performed by a base station communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 2105, the base station may receive a mode switch message from a repeater that indicates a request to switch from a first mode to an interference management mode based on detection that a received signal strength measurement for a received first signal satisfies a signal strength threshold. The operations of 2105 may be performed according to the methods described herein. In some examples, aspects of the operations of 2105 may be performed by a mode switch request receiver as described with reference to FIGS. 6 through 9. Additionally or alternatively, means for performing 2105 may, but not necessarily, include, for example, antenna 925, transceiver 920, base station communications manager 910, memory 930 (including code 935), processor 940 and/or bus 950.

At 2110, the base station may transmit, to the repeater, a mode switch response message that instructs the repeater to operate in the interference management mode based on the mode switch message. The operations of 2110 may be performed according to the methods described herein. In some examples, aspects of the operations of 2110 may be performed by a mode switch response transmitter as described with reference to FIGS. 6 through 9. Additionally or alternatively, means for performing 2110 may, but not necessarily, include, for example, antenna 925, transceiver 920, base station communications manager 910, memory 930 (including code 935), processor 940 and/or bus 950.

At 2115, the base station may transmit, in accordance with the interference management mode, a beamformed signal to the repeater based on the mode switch message. The operations of 2115 may be performed according to the methods described herein. In some examples, aspects of the operations of 2115 may be performed by an interference management mode signal transmitter as described with reference to FIGS. 6 through 9. Additionally or alternatively, means for performing 2115 may, but not necessarily, include, for example, antenna 925, transceiver 920, base station communications manager 910, memory 930 (including code 935), processor 940 and/or bus 950.

The following provides an overview of aspects of the present disclosure:

Aspect 1: A method for wireless communications by a repeater, comprising: transmitting a mode switch message to a base station that indicates a request to switch from a first mode to a coverage expansion mode based at least in part on detection that amplification of a first signal received over a first bandwidth does not satisfy an amplification threshold; and transmitting, in accordance with the coverage expansion mode, an egress signal that is an amplified version of an ingress signal that is received over a second bandwidth that is narrower than the first bandwidth based at least in part on the mode switch message.

Aspect 2: The method of aspect 1, wherein transmitting the mode switch message comprises: transmitting the mode switch message as a beacon signal.

Aspect 3: The method of any of aspects 1 through 2, further comprising: receiving, from the base station, a mode switch response message that instructs the repeater to operate in the coverage expansion mode based at least in part on the mode switch message.

Aspect 4: The method of any of aspects 1 through 3, further comprising: transmitting a second mode switch message to the base station that indicates a request to switch from the coverage expansion mode to the first mode; and transmitting a second egress signal that is an amplified version of a second ingress signal that is received over the first bandwidth based at least in part on the second mode switch message.

Aspect 5: The method of aspect 4, wherein transmitting the second mode switch message comprises: transmitting the second mode switch message as a beacon signal.

Aspect 6: The method of any of aspects 1 through 5, further comprising: receiving, from the base station, a mode switch response message that instructs the repeater to operate in the first mode.

Aspect 7: The method of any of aspects 1 through 6, wherein the amplification threshold is an effective isotropic radiated power threshold.

Aspect 8: The method of any of aspects 1 through 7, wherein the coverage expansion mode is a frequency selective mode.

Aspect 9: The method of any of aspects 1 through 8, wherein the ingress signal is received via a carrier having the second bandwidth.

Aspect 10: A method for wireless communications by a repeater, comprising: transmitting a mode switch message to a base station that indicates a request to switch from a first mode to an interference management mode based at least in part on detection that a received signal strength measurement for a received first signal satisfies a signal strength threshold; and transmitting, in accordance with the interference management mode, an egress signal that is an amplified version of a beamformed ingress signal based at least in part on the mode switch message.

Aspect 11: The method of aspect 10, wherein transmitting the mode switch message comprises: transmitting the mode switch message as a beacon signal.

Aspect 12: The method of any of aspects 10 through 11, further comprising: receiving, from the base station, a mode switch response message that instructs the repeater to operate in the interference management mode based at least in part on the mode switch message.

Aspect 13: The method of any of aspects 10 through 12, further comprising: receiving, from the base station, a mode switch response message that instructs the repeater to operate in the first mode.

Aspect 14: The method of any of aspects 10 through 13, further comprising: receiving, to the repeater, a mode switch response message that instructs the repeater to operate in the first mode.

Aspect 15: An apparatus for wireless communications by a repeater, comprising a processor; memory coupled with the processor; and instructions stored in the memory and executable by the processor to cause the apparatus to perform a method of any of aspects 1 through 9.

Aspect 16: An apparatus for wireless communications by a repeater, comprising at least one means for performing a method of any of aspects 1 through 9.

Aspect 17: A non-transitory computer-readable medium storing code for wireless communications by a repeater, the code comprising instructions executable by a processor to perform a method of any of aspects 1 through 9.

Aspect 18: An apparatus for wireless communications by a repeater, comprising a processor; memory coupled with the processor; and instructions stored in the memory and executable by the processor to cause the apparatus to perform a method of any of aspects 10 through 14.

Aspect 19: An apparatus for wireless communications by a repeater, comprising at least one means for performing a method of any of aspects 10 through 14.

Aspect 20: A non-transitory computer-readable medium storing code for wireless communications by a repeater, the code comprising instructions executable by a processor to perform a method of any of aspects 10 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a repeater, comprising:
    transmitting a mode switch message to a base station that indicates a request to switch from a first mode to a coverage expansion mode based at least in part on detection that amplification of a first signal received over a first bandwidth does not satisfy an amplification threshold; and
    transmitting, in accordance with the coverage expansion mode, an egress signal that is an amplified version of an ingress signal that is received over a second bandwidth that is narrower than the first bandwidth based at least in part on the mode switch message.

2. The method of claim 1, wherein transmitting the mode switch message comprises:
    transmitting the mode switch message as a beacon signal.

3. The method of claim 1, further comprising:
    receiving, from the base station, a mode switch response message that instructs the repeater to operate in the coverage expansion mode based at least in part on the mode switch message.

4. The method of claim 1, further comprising:
    transmitting a second mode switch message to the base station that indicates a request to switch from the coverage expansion mode to the first mode; and transmitting a second egress signal that is an amplified version of a second ingress signal that is received over the first bandwidth based at least in part on the second mode switch message.

5. The method of claim 4, wherein transmitting the second mode switch message comprises:
transmitting the second mode switch message as a beacon signal.

6. The method of claim 1, further comprising:
receiving, from the base station, a mode switch response message that instructs the repeater to operate in the first mode.

7. The method of claim 1, wherein the amplification threshold is an effective isotropic radiated power threshold.

8. The method of claim 1, wherein the coverage expansion mode is a frequency selective mode.

9. The method of claim 1, wherein the ingress signal is received via a carrier having the second bandwidth.

10. An apparatus for wireless communications by a repeater, comprising:
a processor of the repeater;
memory in electronic communication with the processor, the processor and memory configured to:
transmit a mode switch message to a base station that indicates a request to switch from a first mode to a coverage expansion mode based at least in part on detection that amplification of a first signal received over a first bandwidth does not satisfy an amplification threshold; and
transmit, in accordance with the coverage expansion mode, an egress signal that is an amplified version of an ingress signal that is received over a second bandwidth that is narrower than the first bandwidth based at least in part on the mode switch message.

11. The apparatus of claim 10, the processor and memory further configured to:
transmit the mode switch message as a beacon signal.

12. The apparatus of claim 10, the processor and memory further configured to:
receive, from the base station, a mode switch response message that instructs the repeater to operate in the coverage expansion mode based at least in part on the mode switch message.

13. The apparatus of claim 10, the processor and memory further configured to:
transmit a second mode switch message to the base station that indicates a request to switch from the coverage expansion mode to the first mode; and
transmit a second egress signal that is an amplified version of a second ingress signal that is received over the first bandwidth based at least in part on the second mode switch message.

14. The apparatus of claim 13, the processor and memory further configured to:
transmit the second mode switch message as a beacon signal.

15. The apparatus of claim 10, the processor and memory further configured to:
receive, from the base station, a mode switch response message that instructs the repeater to operate in the first mode.

16. The apparatus of claim 10, wherein the amplification threshold is an effective isotropic radiated power threshold.

17. The apparatus of claim 10, wherein the coverage expansion mode is a frequency selective mode.

18. The apparatus of claim 10, wherein the ingress signal is received via a carrier having the second bandwidth.

19. An apparatus for wireless communications by a repeater, comprising:
means for transmitting a mode switch message to a base station that indicates a request to switch from a first mode to a coverage expansion mode based at least in part on detection that amplification of a first signal received over a first bandwidth does not satisfy an amplification threshold; and
means for transmitting, in accordance with the coverage expansion mode, an egress signal that is an amplified version of an ingress signal that is received over a second bandwidth that is narrower than the first bandwidth based at least in part on the mode switch message.

20. The apparatus of claim 19, wherein the means for transmitting the mode switch message comprise:
means for transmitting the mode switch message as a beacon signal.

21. The apparatus of claim 19, further comprising:
means for receiving, from the base station, a mode switch response message that instructs the repeater to operate in the coverage expansion mode based at least in part on the mode switch message.

22. The apparatus of claim 19, further comprising:
means for transmitting a second mode switch message to the base station that indicates a request to switch from the coverage expansion mode to the first mode; and
means for transmitting a second egress signal that is an amplified version of a second ingress signal that is received over the first bandwidth based at least in part on the second mode switch message.

23. The apparatus of claim 22, wherein the means for transmitting the second mode switch message comprise:
means for transmitting the second mode switch message as a beacon signal.

24. The apparatus of claim 19, further comprising:
means for receiving, from the base station, a mode switch response message that instructs the repeater to operate in the first mode.

25. The apparatus of claim 19, wherein the amplification threshold is an effective isotropic radiated power threshold.

26. The apparatus of claim 19, wherein the coverage expansion mode is a frequency selective mode.

27. The apparatus of claim 19, wherein the ingress signal is received via a carrier having the second bandwidth.

28. A non-transitory computer-readable medium storing code for wireless communications by a repeater, the code comprising instructions executable by a processor to cause the repeater to:
transmit a mode switch message to a base station that indicates a request to switch from a first mode to a coverage expansion mode based at least in part on detection that amplification of a first signal received over a first bandwidth does not satisfy an amplification threshold; and
transmit, in accordance with the coverage expansion mode, an egress signal that is an amplified version of an ingress signal that is received over a second bandwidth that is narrower than the first bandwidth based at least in part on the mode switch message.

29. The non-transitory computer-readable medium of claim 28, wherein the instructions to transmit the mode switch message are executable by the processor to cause the repeater to:
transmit the mode switch message as a beacon signal.

30. The non-transitory computer-readable medium of claim 28, wherein the instructions are further executable by the processor to cause the repeater to:
  receive, from the base station, a mode switch response message that instructs the repeater to operate in the coverage expansion mode based at least in part on the mode switch message.

* * * * *